(12) United States Patent
Manolakos et al.

(10) Patent No.: US 12,047,903 B2
(45) Date of Patent: *Jul. 23, 2024

(54) MULTI-LEVEL CONFIGURATION AND REPORTING FOR POSITIONING IN NEW RADIO

(71) Applicant: QUALCOMM Incorporated, San Diego, CA (US)

(72) Inventors: Alexandros Manolakos, Escondido, CA (US); Sven Fischer, Nuremberg (DE); Guttorm Ringstad Opshaug, Redwood City, CA (US); Sony Akkarakaran, Poway, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,278

(22) Filed: Jun. 29, 2022

(65) Prior Publication Data

US 2022/0338157 A1 Oct. 20, 2022

Related U.S. Application Data

(63) Continuation of application No. 16/781,791, filed on Feb. 4, 2020, now Pat. No. 11,405,884.

(30) Foreign Application Priority Data

Feb. 14, 2019 (GR) .............................. 20190100082

(51) Int. Cl.
*H04W 64/00* (2009.01)
*H04B 1/00* (2006.01)
(Continued)

(52) U.S. Cl.
CPC .......... *H04W 64/003* (2013.01); *H04B 1/005* (2013.01); *H04L 1/0026* (2013.01);
(Continued)

(58) Field of Classification Search
None
See application file for complete search history.

(56) References Cited

U.S. PATENT DOCUMENTS 10,033,449 B2 7/2018 Lee et al.
10,390,324 B2 8/2019 Kazmi et al.
(Continued)

FOREIGN PATENT DOCUMENTS

CN 103609161 A 2/2014
WO WO2017194675 A1 11/2017

OTHER PUBLICATIONS

Taiwan Search Report—TW109103940—TIPO—Apr. 28, 2023.
(Continued)

*Primary Examiner* — Scott M Sciacca
(74) *Attorney, Agent, or Firm* — QUALCOMM Incorporated

(57) ABSTRACT

This disclosure provides methods, devices, and systems for multi-level configuration and reporting for positioning in new radio (NR) wireless communications systems. In some wireless communications systems, a network entity may determine a position or location of a supported user equipment (UE) using radio access network information. The information may be associated with UE-assisted positioning techniques, such as a positioning reference signal (PRS) transmission by the base station and reporting of radio signaling measurements by the UE. The UE may support a multi-level configuration for reporting the radio signaling measurements, including determined report quantities on one or more of a resource level, a set level, or a setting level
(Continued)

for the PRS transmission, or generally for the network entity. The described techniques may improve robustness associated with the reporting and, in some examples, reduce signaling overhead associated with determining a positioning and location of the UE.

25 Claims, 16 Drawing Sheets

(51) Int. Cl.
    *H04L 1/00*     (2006.01)
    *H04L 5/00*     (2006.01)
    *H04W 4/02*     (2018.01)
    *H04W 24/10*     (2009.01)

(52) U.S. Cl.
    CPC .......... *H04L 5/0048* (2013.01); *H04L 5/0057* (2013.01); *H04W 4/02* (2013.01); *H04W 24/10* (2013.01)

(56) References Cited

U.S. PATENT DOCUMENTS

| | | | |
|---|---|---|---|
| 10,511,986 | B2 | 12/2019 | Siomina et al. |
| 2012/0040687 | A1 | 2/2012 | Siomina et al. |
| 2012/0264449 | A1 | 10/2012 | Kazmi et al. |
| 2016/0249344 | A1 | 8/2016 | Schlienz et al. |
| 2017/0303153 | A1 | 10/2017 | Siomina et al. |
| 2018/0302873 | A1 | 10/2018 | Kazmi et al. |
| 2020/0267682 | A1 | 8/2020 | Manolakos et al. |
| 2021/0112522 | A1 | 4/2021 | Kim et al. |
| 2022/0095265 | A1* | 3/2022 | Cha .................... H04W 64/006 |

OTHER PUBLICATIONS

International Preliminary Report on Patentability—PCT/US2020/016880 The International Bureau of WIPO—Geneva, Switzerland, Aug. 26, 2021.
International Search Report and Written Opinion—PCT/US2020/016880—ISA/EPO—May 14, 2020.
Qualcomm Incorporated: "On Demand Transmission of PRS for NR," 3GPP Draft, 3GPP TSG-RAN WG2 Meeting #104, R2-1817902_(On Demand PRS), 3rd Generation Partnership Project (3GPP), Mobile Competence Centre, 650, Route Des Lucioles, F-06921, Sophia-Antipolis Cedex, France, vol. RAN WG2. No. Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip [retrieved on Nov. 12, 2018], the whole document, Sections 9.2.x.3 and 9.2.x.6; figures9.2.x.3-1,9.2.x.6-1, 9.2.x.2.1,9.2.x.3.1.
Intel Corporation: "Analysis of Techniques for NR DL Positioning", 3GPP Draft, R1-1900512, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, Jan. 12, 2019 (Jan. 12, 2019), pp. 1-25, XP051576118, pp. 1, 2, 3, 5 pp. 11, 13 chapter 8, p. 20 figures 1, 2, 3 Chapter 6.1.3, p. 16.
Qualcomm Incorporated: "Combined Downlink and Uplink NR Positioning Procedures", 3GPP TSG-RAN WG2 Meeting #104, R2-1817899, 3rd Generation Partnership Project, Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018, XP051481785, pp. 1-18, Para 0001-0003, p. 4, Figures 1-5, Figure 4.

* cited by examiner

MULTI-LEVEL CONFIGURATION AND REPORTING FOR POSITIONING IN NEW RADIO

CROSS REFERENCE

The present application for Patent is a Continuation of U.S. patent application Ser. No. 16/781,791 by MANOLAKOS et al., entitled "MULTI-LEVEL CONFIGURATION AND REPORTING FOR POSITIONING IN NEW RADIO" filed Feb. 4, 2020, which claims the benefit of Greece Provisional Patent Application No. 20190100082 by MANOLAKOS et al., entitled "MULTI-LEVEL CONFIGURATION AND REPORTING FOR POSITIONING IN NEW RADIO," filed Feb. 14, 2019, assigned to the assignee hereof, and expressly incorporated by reference in its entirety herein.

TECHNICAL FIELD

The following relates generally to wireless communications, and more specifically to multi-level configuration and reporting for positioning in new radio (NR).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may determine a position or location of a supported UE using radio access network information. The information may be associated with UE-assisted positioning techniques, such as a reference signal transmission, by the base station and reporting of radio signaling measurements by the UE. These methods may support various location services (for example, navigation systems, emergency communications), and supplement one or more additional location systems supported by wireless communications devices (such as global positioning system (GPS) technology). As data traffic increases, however, other reporting of radio signaling measurements fail to provide robust signaling and communication within some environments, including in new radio (NR) systems. Improved techniques and systems are desired.

SUMMARY

The described techniques relate to methods, systems, devices, and apparatuses that support multi-level configuration and reporting for positioning in new radio (NR) systems. Generally, the described techniques support a user equipment (UE) receiving a positioning reference signal (PRS) transmission that includes one or more PRS resources, among other information. The PRS resources may span one or more PRS resource sets corresponding or configured according to a PRS resource setting of one or more network entities, transmission/reception points (TRPs), or base stations. Based on the reception, the UE may determine report parameters (which may include or be referred to as report quantities) based on measurements of the received PRS resources. The UE may format a message for the report parameters according to one or more report options, such as multi-level report options, associated with the UE positioning. The reporting options may include reporting the determined report parameters on one or more of a resource level, a set level, a setting level, or generally for the network entity or base station. The reporting options provide more robust reporting and, in some examples, reduce signaling overhead associated with determining positioning and location information related to the UE.

A method of wireless communication at a UE is described. The method may include transmitting, to a network entity, an indication of a capability for reporting measurements related to positioning of the UE, receiving, from the network entity based on the indication, signaling including one or more configurations associated with one or more TRPs, the one or more configurations including one or more positioning reference signal resources and one or more reporting levels for the UE including a first reporting level for the UE, determining, based on the one or more configurations, one or more report parameters associated with the positioning of the UE, and transmitting, to the network entity based on the one or more configurations, the one or more report parameters using the first reporting level for the UE or a second reporting level for the UE that is different than the first reporting level.

An apparatus for wireless communication at a UE is described. The apparatus may include a processor, memory coupled with the processor, and instructions stored in the memory. The instructions may be executable by the processor to cause the apparatus to transmit, to a network entity, an indication of a capability for reporting measurements related to positioning of the UE, receive, from the network entity based on the indication, signaling including one or more configurations associated with one or more TRPs, the one or more configurations including one or more positioning reference signal resources and one or more reporting levels for the UE including a first reporting level for the UE, determine, based on the one or more configurations, one or more report parameters associated with the positioning of the UE, and transmit, to the network entity based on the one or more configurations, the one or more report parameters using the first reporting level for the UE or a second reporting level for the UE that is different than the first reporting level.

Another apparatus for wireless communication at a UE is described. The apparatus may include means for transmitting, to a network entity, an indication of a capability for reporting measurements related to positioning of the UE, receiving, from the network entity based on the indication, signaling including one or more configurations associated with one or more TRPs, the one or more configurations including one or more positioning reference signal resources and one or more reporting levels for the UE including a first reporting level for the UE, determining, based on the one or more configurations, one or more report parameters associated with the positioning of the UE, and transmitting, to the network entity based on the one or more configurations, the one or more report parameters using the first reporting level for the UE or a second reporting level for the UE that is different than the first reporting level.

A non-transitory computer-readable medium storing code for wireless communication at a UE is described. The code may include instructions executable by a processor to transmit, to a network entity, an indication of a capability for reporting measurements related to positioning of the UE, receive, from the network entity based on the indication, signaling including one or more configurations associated with one or more TRPs, the one or more configurations including one or more positioning reference signal resources and one or more reporting levels for the UE including a first reporting level for the UE, determine, based on the one or more configurations, one or more report parameters associated with the positioning of the UE, and transmit, to the network entity based on the one or more configurations, the one or more report parameters using the first reporting level for the UE or a second reporting level for the UE that is different than the first reporting level.

In some examples of the method, apparatuses, and non-transitory computer-readable medium described herein, determining the one or more report parameters may include operations, features, means, or instructions for determining a report parameter for at least one positioning reference signal resource of the one or more positioning reference signal resources.

Some examples of the method, apparatuses, and non-transitory computer-readable medium described herein may further include operations, features, means, or instructions for transmitting the one or more report parameters includes transmitting, using the second reporting level for the UE, a selected report parameter for at least one positioning reference signal resource set of one or more positioning reference signal resource sets.

Some examples of the method, apparatuses, and non-transitory computer-readable medium described herein may further include operations, features, means, or instructions for identifying one or more of a number of the one or more positioning reference signal resources included in a positioning reference resource set, a number of positioning reference resource sets, or a number of TRPs, and where transmitting the one or more report parameters includes transmitting, based on the identifying, the one or more report parameters using the second reporting level for the UE that may be different than the first reporting level.

Some examples of the method, apparatuses, and non-transitory computer-readable medium described herein may further include operations, features, means, or instructions for identifying one or more of a positioning procedure of the UE or a reporting parameter for transmitting the one or more report parameters, and where transmitting the one or more report parameters includes transmitting, based on the identifying, the one or more report parameters using the second reporting level for the UE that may be different than the first reporting level.

In some examples of the method, apparatuses, and non-transitory computer-readable medium described herein, the one or more report parameters include one or more report quantities, including one or more of a reference signal time difference, a reference signal receive power, an angle, a positioning reference signal identification number, a reception to transmission difference, a signal-to-noise ratio, or a reference signal receive quality.

In some examples of the method, apparatuses, and non-transitory computer-readable medium described herein, determining the one or more report parameters may include operations, features, means, or instructions for determining a report parameter for at least one positioning reference signal resource of the one or more positioning reference signal resources, the one or more positioning reference signal resources spanning one or more positioning reference signal resource sets, the one or more positioning reference signal resource sets corresponding to one or more positioning reference signal resource settings.

In some examples of the method, apparatuses, and non-transitory computer-readable medium described herein, transmitting the one or more report parameters may include operations, features, means, or instructions for transmitting the report parameter for the at least one positioning reference signal resource included in the one or more positioning reference signal resource sets using a first reporting level for the UE.

Some examples of the method, apparatuses, and non-transitory computer-readable medium described herein may further include operations, features, means, or instructions for identifying a reference report parameter associated with a positioning reference signal resource included in a positioning reference signal resource set of the one or more positioning reference signal resource sets, determining, based on the identifying, a differential between the reference report parameter and the report parameter for each additional reference signal resource included in the positioning reference signal resource set, and where transmitting the report parameter for at least one positioning reference signal resource may be based on determining the differential.

Some examples of the method, apparatuses, and non-transitory computer-readable medium described herein may further include operations, features, means, or instructions for transmitting the one or more report parameters includes transmitting, using the second reporting level for the UE, a selected report parameter for at least one positioning reference signal resource set of one or more positioning reference signal resource sets, and where each of the one or more positioning reference signal resource sets may be associated with a corresponding positioning reference signal resource setting of one or more positioning reference signal resource settings.

In some examples of the method, apparatuses, and non-transitory computer-readable medium described herein, the second reporting level for the UE may be a reporting level of the one or more reporting levels for the UE indicated by the signaling including the one or more configurations.

In some examples of the method, apparatuses, and non-transitory computer-readable medium described herein, the selected report parameter for the at least one positioning reference signal resource set corresponds to a positioning reference signal resource that may be included in a positioning reference signal resource set associated with the corresponding positioning reference signal resource setting and a configured reference identification value.

Some examples of the method, apparatuses, and non-transitory computer-readable medium described herein may further include operations, features, means, or instructions for transmitting the selected report parameter for the at least one positioning reference signal resource set may be based on a combining of the report parameter for each positioning reference signal resource included in a positioning reference signal resource set associated with the corresponding positioning reference signal resource setting.

Some examples of the method, apparatuses, and non-transitory computer-readable medium described herein may further include operations, features, means, or instructions for identifying a reference report parameter associated with a positioning reference signal resource set of the one or more positioning reference signal resource sets associated with the corresponding positioning reference signal resource setting, determining, based on the identifying, a differential between the reference report parameter and the report parameter for each additional reference signal resource set associated with the corresponding positioning reference signal resource setting, and where transmitting the selected report parameter for the at least one positioning reference signal resource set may be based on determining the differential.

Some examples of the method, apparatuses, and non-transitory computer-readable medium described herein may further include operations, features, means, or instructions for transmitting, using a third reporting level for the UE, a selected report parameter associated with at least one positioning reference signal resource setting of one or more positioning reference signal resource settings, and where the at least one positioning reference signal resource setting of the one or more positioning reference signal resource settings may be associated with a corresponding subset of positioning reference signal resources of one or more positioning reference signal resource sets.

In some examples of the method, apparatuses, and non-transitory computer-readable medium described herein, the third reporting level for the UE may be a reporting level of the one or more reporting levels for the UE indicated by the signaling including the one or more configurations.

In some examples of the method, apparatuses, and non-transitory computer-readable medium described herein, the selected report parameter for the at least one positioning reference signal resource setting corresponds to a positioning reference signal resource that may be included in the subset of the one or more positioning reference signal resource sets and may be associated with a configured reference identification value.

Some examples of the method, apparatuses, and non-transitory computer-readable medium described herein may further include operations, features, means, or instructions for transmitting the selected report parameter for the at least one positioning reference signal resource setting may be based on a combining of the report parameter for the at least one positioning reference signal resource included in the subset of the one or more positioning reference signal resource sets.

Some examples of the method, apparatuses, and non-transitory computer-readable medium described herein may further include operations, features, means, or instructions for wherein transmitting the selected report parameter for the at least one positioning reference signal resource setting includes transmitting the reference signal time difference.

Some examples of the method, apparatuses, and non-transitory computer-readable medium described herein may further include operations, features, means, or instructions for transmitting, using a fourth reporting level for the UE, a selected report parameter for at least one TRP of the one or more TRPs.

In some examples of the method, apparatuses, and non-transitory computer-readable medium described herein, the fourth reporting level for the UE may be a reporting level of the one or more reporting levels for the UE indicated by the signaling including the one or more configurations.

In some examples of the method, apparatuses, and non-transitory computer-readable medium described herein, the selected report parameter for the at least one TRP corresponds to a positioning reference signal resource of the one or more positioning reference signal resources and may be associated with a configured reference identification value.

Some examples of the method, apparatuses, and non-transitory computer-readable medium described herein may further include operations, features, means, or instructions for transmitting the selected report parameter for the base station may be based on a combining of the report parameter for the one or more positioning reference signal resources.

Some examples of the method, apparatuses, and non-transitory computer-readable medium described herein may further include operations, features, means, or instructions for determining a reference signal time difference between a first time of arrival associated with a first TRP of the one or more TRPs and a second time of arrival associated with a second TRP of the one or more TRPs, and where transmitting the selected report parameter for the base station includes transmitting the reference signal time difference.

Some examples of the method, apparatuses, and non-transitory computer-readable medium described herein may further include operations, features, means, or instructions for determining, based on the signaling, one or more additional report parameters associated with the positioning of the UE that may be configured according to a third reporting level for the UE, transmitting the one or more additional report parameters corresponding to a first subset of the one or more positioning reference signal resources using the third reporting level for the UE that may be different than the first reporting level and the second reporting level, and where transmitting the one or more report parameters includes transmitting the one or more report parameters corresponding to a second subset of the one or more positioning reference signal resources using the first reporting level or the second reporting level.

In some examples of the method, apparatuses, and non-transitory computer-readable medium described herein, determining the one or more report parameters associated with the positioning of the UE may include operations, features, means, or instructions for determining the second reporting level for the UE.

Some examples of the method, apparatuses, and non-transitory computer-readable medium described herein may further include operations, features, means, or instructions for determining an available resource size for transmitting the one or more report parameters, and where transmitting the one or more report parameters includes transmitting, based on determining the available resource size, the one or more report parameters using the second reporting level for the UE that may be different than the first reporting level.

Some examples of the method, apparatuses, and non-transitory computer-readable medium described herein may further include operations, features, means, or instructions for determining whether the UE may be configured for transmitting the one or more report parameters using the first reporting level, and where determining the one or more report parameters associated with the positioning of the UE includes determining the one or more report parameters associated with the positioning of the UE configured according to the second reporting level different than the first reporting level based on determining whether the UE may be configured for transmitting the one or more report parameters using the first reporting level.

In some examples of the method, apparatuses, and non-transitory computer-readable medium described herein, the one or more TRPs may be associated with one or more base stations.

A method of wireless communication at a network entity is described. The method may include receiving, from a UE, an indication of a capability for reporting measurements related to positioning of the UE, determining, based on the indication, one or more configurations associated with one or more TRPs, the one or more configurations including one or more positioning reference signal resources and one or more reporting levels for the UE including a first reporting level for the UE, transmitting, to the UE based on the determining, signaling including the one or more configurations, and receiving, from the UE based on the one or more configurations, one or more report parameters associated with the positioning of the UE with the first reporting level for the UE or a second reporting level for the UE that is different than the first reporting level.

An apparatus for wireless communication at a network entity is described. The apparatus may include a processor, memory coupled with the processor, and instructions stored in the memory. The instructions may be executable by the processor to cause the apparatus to receive, from a UE, an indication of a capability for reporting measurements related to positioning of the UE, determine, based on the indication, one or more configurations associated with one or more TRPs, the one or more configurations including one or more positioning reference signal resources and one or more reporting levels for the UE including a first reporting level for the UE, transmit, to the UE based on the determining, signaling including the one or more configurations, and receive, from the UE based on the one or more configurations, one or more report parameters associated with the positioning of the UE with the first reporting level for the UE or a second reporting level for the UE that is different than the first reporting level.

Another apparatus for wireless communication at a network entity is described. The apparatus may include means for receiving, from a UE, an indication of a capability for reporting measurements related to positioning of the UE, determining, based on the indication, one or more configurations associated with one or more TRPs, the one or more configurations including one or more positioning reference signal resources and one or more reporting levels for the UE including a first reporting level for the UE, transmitting, to the UE based on the determining, signaling including the one or more configurations, and receiving, from the UE based on the one or more configurations, one or more report parameters associated with the positioning of the UE with the first reporting level for the UE or a second reporting level for the UE that is different than the first reporting level.

A non-transitory computer-readable medium storing code for wireless communication at a network entity is described. The code may include instructions executable by a processor to receive, from a UE, an indication of a capability for reporting measurements related to positioning of the UE, determine, based on the indication, one or more configurations associated with one or more TRPs, the one or more configurations including one or more positioning reference signal resources and one or more reporting levels for the UE including a first reporting level for the UE, transmit, to the UE based on the determining, signaling including the one or more configurations, and receive, from the UE based on the one or more configurations, one or more report parameters associated with the positioning of the UE with the first reporting level for the UE or a second reporting level for the UE that is different than the first reporting level.

In some examples of the method, apparatuses, and non-transitory computer-readable medium described herein, the one or more configurations associated with the one or more TRPs may be based on a periodicity of receiving the indication.

In some examples of the method, apparatuses, and non-transitory computer-readable medium described herein, the one or more report parameters include one or more report quantities, including one or more of a reference signal time difference, a reference signal receive power, an angle, a positioning reference signal identification number, a reception to transmission difference, a reference signal-to-noise ratio, or a reference signal receive quality.

Some examples of the method, apparatuses, and non-transitory computer-readable medium described herein may further include operations, features, means, or instructions for receiving signaling from at least one of the one or more TRPs, and where determining the one or more configurations may be based on the receiving the signaling.

Some examples of the method, apparatuses, and non-transitory computer-readable medium described herein may further include operations, features, means, or instructions for configuring each of one or more positioning reference signal resource sets according to a positioning reference signal resource setting of the one or more positioning reference signal resource settings, each of the one or more report parameters corresponding to a positioning reference signal resource of the one or more positioning reference signal resources that span the one or more positioning reference signal resource sets, and where transmitting the signaling may be based on the configuring.

In some examples of the method, apparatuses, and non-transitory computer-readable medium described herein, receiving the one or more report parameters may include operations, features, means, or instructions for receiving the report parameter for at least one positioning reference signal resource included in the one or more positioning reference signal resource sets based on the first reporting level for the UE.

Some examples of the method, apparatuses, and non-transitory computer-readable medium described herein may further include operations, features, means, or instructions for receiving a reference report parameter associated with a positioning reference signal resource included in a positioning reference signal resource set of the one or more positioning reference signal resource sets, and receiving the report parameter for each additional reference signal resource included in the positioning reference signal resource set, the report parameter for each additional reference signal resource including a differential relative to the reference report parameter.

Some examples of the method, apparatuses, and non-transitory computer-readable medium described herein may further include operations, features, means, or instructions for receiving, based on a second reporting level for the UE, the one or more report parameters includes receiving a selected report parameter for at least one positioning reference signal resource set of the one or more positioning reference signal resource sets, and where each of the one or more positioning reference signal resource sets may be associated with a corresponding positioning reference signal resource setting of one or more positioning reference signal resource settings.

In some examples of the method, apparatuses, and non-transitory computer-readable medium described herein, the second reporting level for the UE may be a reporting level of the one or more reporting levels for the UE indicated by the signaling including the one or more configurations.

In some examples of the method, apparatuses, and non-transitory computer-readable medium described herein, the selected report parameter for the at least one positioning reference signal resource set corresponds to a positioning reference signal resource that may be included in a positioning reference signal resource set associated with the corresponding positioning reference signal resource setting and a configured reference identification value.

Some examples of the method, apparatuses, and non-transitory computer-readable medium described herein may further include operations, features, means, or instructions for receiving the selected report parameter for the at least one positioning reference signal resource set may be based on a combining of the report parameter for each positioning reference signal resource included in a positioning reference signal resource set associated with the corresponding positioning reference signal resource setting.

Some examples of the method, apparatuses, and non-transitory computer-readable medium described herein may further include operations, features, means, or instructions for receiving a reference report parameter associated with a positioning reference signal resource set of the one or more positioning reference signal resource sets associated with the corresponding positioning reference signal resource setting, and receiving the report parameter for each additional reference signal resource set associated with the corresponding positioning reference signal resource setting, the report parameter for each additional reference signal resource set including a differential relative to the reference report parameter.

Some examples of the method, apparatuses, and non-transitory computer-readable medium described herein may further include operations, features, means, or instructions for receiving, based on a third reporting level for the UE, a selected report parameter for at least one positioning reference signal resource setting of the one or more positioning reference signal resource settings that may be each associated with a subset of the one or more positioning reference signal resource sets.

In some examples of the method, apparatuses, and non-transitory computer-readable medium described herein, the third reporting level for the UE may be a reporting level of the one or more reporting levels for the UE indicated by the signaling including the one or more configurations.

In some examples of the method, apparatuses, and non-transitory computer-readable medium described herein, the selected report parameter for each positioning reference signal resource setting corresponds to a positioning reference signal resource that may be included in the subset of the one or more positioning reference signal resource sets and may be associated with a configured reference identification value.

Some examples of the method, apparatuses, and non-transitory computer-readable medium described herein may further include operations, features, means, or instructions for receiving the selected report parameter for each positioning reference signal resource setting may be based on a combining of the report parameter for the at least one positioning reference signal resource included in the subset.

In some examples of the method, apparatuses, and non-transitory computer-readable medium described herein, receiving the selected report parameter for the at least one positioning reference signal resource setting may include operations, features, means, or instructions for receiving a reference signal time difference between a first time of arrival associated with a first positioning reference signal resource setting of the one or more positioning reference signal resource settings and a second time of arrival associated with a second positioning reference signal resource setting of the one or more positioning reference signal resource settings.

Some examples of the method, apparatuses, and non-transitory computer-readable medium described herein may further include operations, features, means, or instructions for receiving, based on a fourth reporting level for the UE, a selected report parameter for at least one TRP of the one or more TRPs.

In some examples of the method, apparatuses, and non-transitory computer-readable medium described herein, the fourth reporting level for the UE may be a reporting level of the one or more reporting levels for the UE indicated by the signaling including the one or more configurations.

In some examples of the method, apparatuses, and non-transitory computer-readable medium described herein, the selected report parameter for the at least one TRP corresponds to a positioning reference signal resource of the one or more positioning reference signal resources and may be associated with a configured reference identification value.

Some examples of the method, apparatuses, and non-transitory computer-readable medium described herein may further include operations, features, means, or instructions for receiving the selected report parameter for the at least one TRP may be based on a combining of the report parameter for the one or more positioning reference signal resources.

In some examples of the method, apparatuses, and non-transitory computer-readable medium described herein, receiving the selected report parameter for the at least one positioning reference signal resource setting may include operations, features, means, or instructions for receiving a reference signal time difference between a first time of arrival associated with a first TRP of the one or more TRPs and a second time of arrival associated with a second TRP of the one or more TRPs.

Some examples of the method, apparatuses, and non-transitory computer-readable medium described herein may further include operations, features, means, or instructions for receiving, from the UE based on the transmitting, one or more additional report parameters associated with the positioning of the UE and configured according to a third reporting level for the UE, and where receiving the one or more report parameters includes receiving the one or more report parameters corresponding to a first subset of the one or more positioning reference signal resources and receiving the one or more additional report parameters corresponding to a second subset of the one or more positioning reference signal resources.

In some examples of the method, apparatuses, and non-transitory computer-readable medium described herein, the one or more TRPs may be associated with one or more base stations.

DETAILED DESCRIPTION

Figure 1:
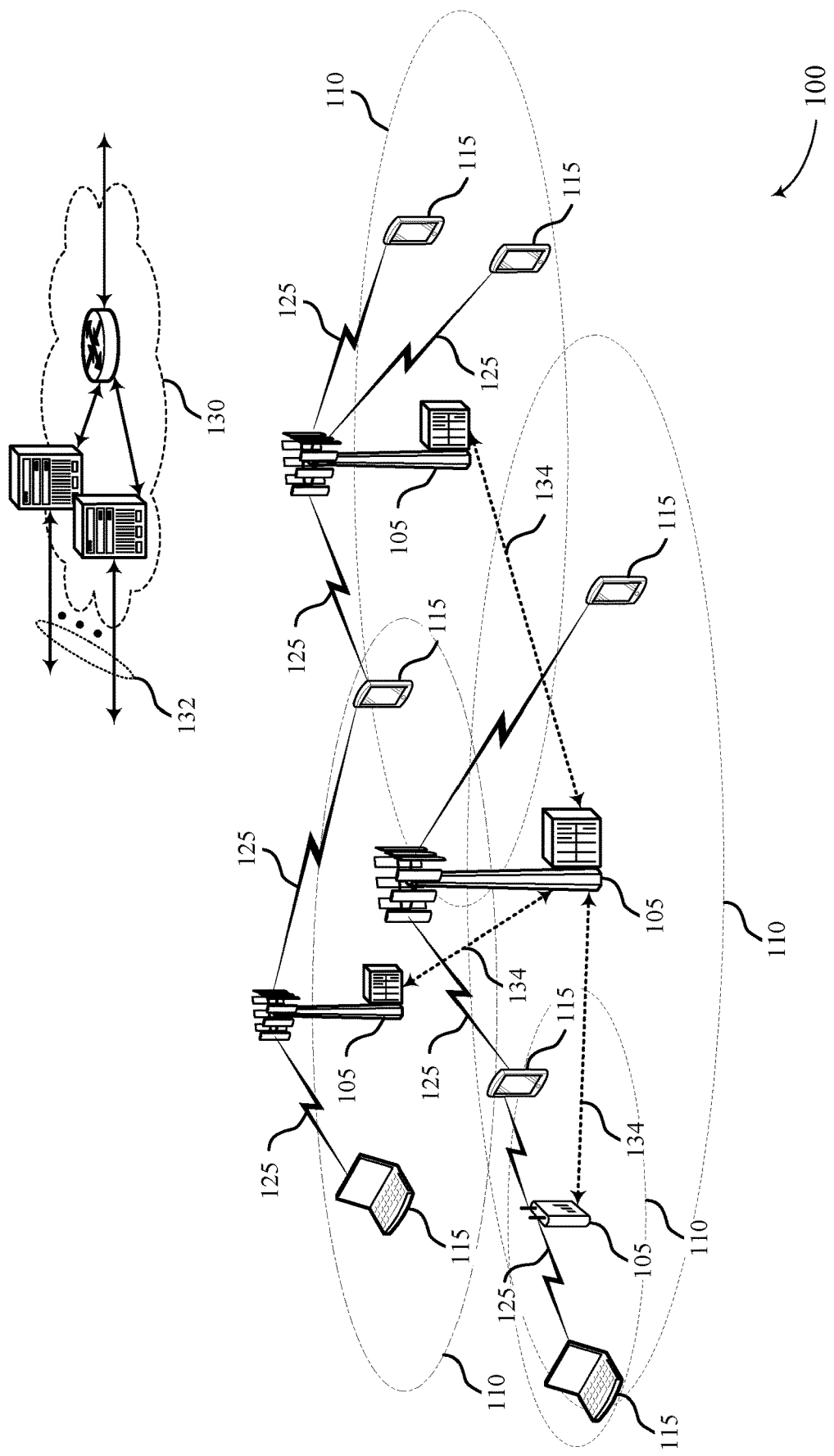
FIG. 1 illustrates an example of a wireless communications system that supports multi-level configuration and reporting for positioning in new radio (NR) systems in accordance with aspects of the present disclosure.

In some wireless communications systems, one or more network entities (e.g., base stations, access network entities, or other nodes) may determine a position or location of a supported user equipment (UE) using radio access network information. The radio access network information may be associated with UE-assisted positioning techniques, such as individual reference signal (for example, positioning reference signal (PRS)) transmissions by the network entities (and/or transmission/reception points (TRPs)) and reporting of radio signaling measurements by the UE. In some wireless communications systems, including some LTE systems, reporting by the UE may be limited to a single generalized measurement of the communication for each network entity or base station. As data traffic increases, however, other reporting of radio signaling measurements does not provide robust signaling within enhanced communication environments, including in new radio (NR) systems.

As described herein, a UE may support a configuration, such as a multi-level configuration, for reporting radio signaling measurements associated with the received PRS resources. The UE may identify, and in some examples, communicate a capability for reporting measurements related to positioning or location information. Based on the identification or the communication, which may be a communication with another device or network entity such as a base station, access network entity, or other node, the UE may receive a PRS transmission and an indication for a reporting level from one or more network entities or TRPs. The UE may determine report parameters (for example, report quantities) based on the PRS resources (such as measurements of the received PRS resources) and format a message for the report parameters according to one or more multi-level reporting options associated with the UE positioning. The multi-level reporting options may include reporting the determined report parameters on one or more of a resource level, a set level, a setting level, or generally for at least some if not each base station of the communication. In some examples, the reporting level of the formatting may be based on the received indication for the reporting lever from the one or more base stations. In other examples, the UE may adjust the reporting level of the formatting according to one or more of available resources of the channel, a reporting quantity of the UE, or a configured positioning procedure, or other conditions. The described techniques improve robustness associated with the reporting and, in some examples, reduce signaling overhead associated with determining a positioning and location information of the UE.

Aspects of the disclosure are initially described in the context of a wireless communications system. Aspects of the disclosure are further described in the context of another wireless communications system, a reporting level architecture, and a process flow that relates to multi-level configuration and reporting for positioning. Aspects of the disclosure are further illustrated by and described with reference to apparatus diagrams, system diagrams, and flowcharts that relate to multi-level configuration and reporting for positioning in NR.

FIG. 1 illustrates an example of a wireless communications system 100 that supports multi-level configuration and reporting for positioning in new radio in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network entities or devices, such as a base station 105, may include or be associated with components or subcomponents such as an access network entity, which may be an example of an access node controller (ANC). Each access network entity may communicate with UEs 115 through a number of other access network transmission entities, which may be referred to as a radio head, a smart radio head, a cell, or a TRP. In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling duration of $T_s=1/30{,}720{,}000$ seconds. Time intervals of a communications resource may be organized according to radio frames each having a duration of 10 milliseconds (ms), where the frame duration may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol duration may contain 2048 sampling periods. In some examples, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

As described herein, wireless communications system 100 may be an NR system and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information (CSI) reference signal (CSI-RS) transmission. Each of the CSI-RS transmissions may be configured for a specific UE 115 to estimate the channel and report channel quality information. The reported channel quality information may be used for scheduling or link adaptation at the base stations 105, or as part of a mobility or beam management procedure for directional transmission associated with the enhanced channel resources.

A base station 105 may configure a CSI-RS transmission on one or more CSI-RS resources of the channel. A CSI-RS resource may start at any OFDM symbol of a slot and occupy one or more symbols depending on a configured number of ports. For example, a CSI-RS resource may span one symbol of a slot and contain one port for transmission. The one or more CSI-RS resources may span a number of CSI-RS resource sets configured according to a CSI-RS resource setting of the base station 105. The structure of the one or more CSI-RS resources, CSI-RS resource sets, and CSI-RS resource settings within a CSI-RS transmission may be referred to as a multi-level resource setting. For example, a multi-level CSI-RS resource setting of the base station 105 may include up to 16 CSI-RS resource sets and each CSI-RS resource set may contain up to 64 CSI-RS resources. In some examples, the base station 105 may support a configured number of distinct CSI-RS resources (for example, 128) over one or more CSI-RS resource sets.

In some examples, a base station 105 may provide an indication (such as the tag "Repetition=ON") associated with a CSI-RS transmission directed to a UE 115. The indication may define whether the UE 115 may assume the included CSI-RS resources within the reference signal (for example, a non-zero power (NZP) CSI-RS transmission) are associated with the same downlink spatial domain transmission filter and correspond to a single transmit beam at the base station 105. The indication may be configured according to a higher layer signaling parameter (for example, reportQuantity) associated with all the reporting settings linked with the CSI-RS resource set. For example, the base station 105 may configure the reportQuantity parameter to a set indication (for example "cri-RSRP", "none", etc.) that indicates a single transmit beam.

At reception, the UE 115 may identify the configured set indication associated with the received higher layer signaling parameter. In some examples (such as "cri-RSRP" reporting), the UE 115 may determine CSI parameters for the one or more CSI-RS resources and report the measurements according to a refined reporting configuration. For example, the UE 115 may determine CSI parameters (for example, reference signal receive power (RSRP) values) for the one or more channel resources. The UE 115 may then condition the reporting according to a configured channel resource indicator (CRI) value, as one example, where the CRI value corresponds to an index of a resource entry associated with the one or more CSI-RS resources in a corresponding CSI-RS resource set for channel measurement.

In some examples, the base stations 105 may transmit one or more additional downlink reference signals for communication, including a positioning reference signal PRS transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Techniques are described for transmitting the one or more report parameters according to a refined reporting configuration. The reporting configuration may be based on the multi-level resource setting of the PRS transmission and may include a multi-level reporting for positioning of the UE 115. In some examples, the UE 115 may format the reporting at a resource level and transmit the report parameter for each PRS resource of the PRS transmission. In other examples, the UE 115 may format the reporting at a set level and transmit a selected report parameter for each PRS resource set corresponding of configured according to a PRS setting of the base station 105. In other examples, the UE 115 may format the reporting at a setting level and transmit a selected report parameter for at least some of if not each positioning reference signal setting of the PRS transmission. In other examples, the UE 115 may format the reporting at a base station level and transmit a report parameter to the base station 105. The described techniques may improve reporting and, in some examples, reduce signaling overhead associated with determining a positioning and location.

Figure 2:
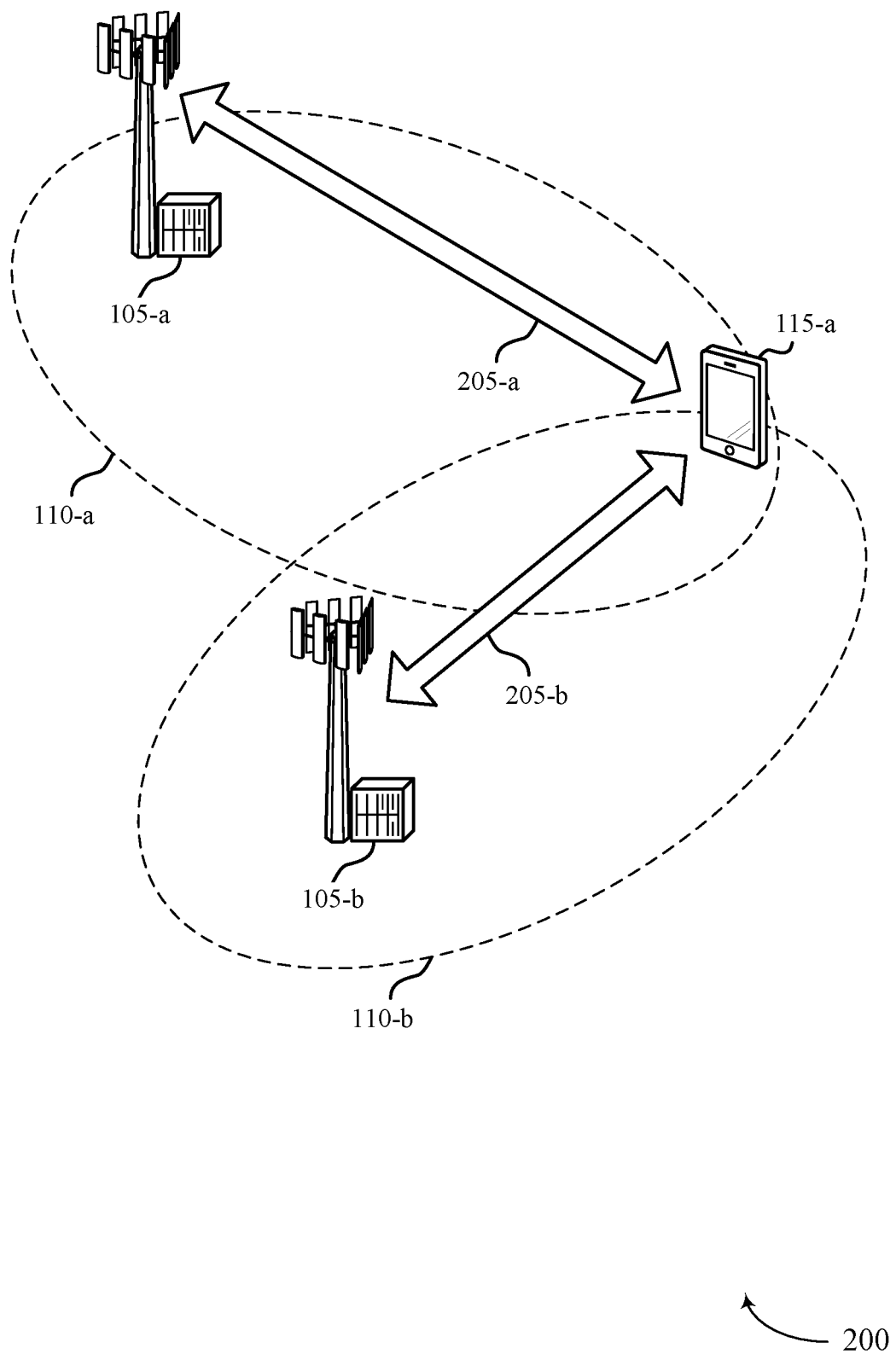
FIG. 2 illustrates an example of a wireless communications system that supports multi-level configuration and reporting for positioning in NR systems in accordance with aspects of the present disclosure.

FIG. 2 illustrates an example of a wireless communications system 200 that supports multi-level configuration and reporting for positioning in NR systems in accordance with aspects of the present disclosure. The wireless communications system 200 may include one or more base stations 105-*a* and 105-*b* that support communication with a UE 115-*a*, which may be examples of corresponding devices as described with reference to FIG. 1. In some examples, the base station 105-*a* may correspond to a serving base station for the UE 115-*a*, and the base station 105-*b* may correspond to a neighboring base station. In other examples, the base station 105-*b* may correspond to a serving base station for the UE 115-*a*, and the base station 105-*a* may correspond to a neighboring base station. In some examples, the wireless communications system 200 may implement aspects of the wireless communications system 100.

In some examples, the UE 115-*a* may transmit an indication (which may include a configured reporting level) to the base station 105-*a* that includes a capability of or related to the UE for reporting location and positioning information. The indication may be part of a UE-assisted positioning technique, and may aid the base station 105-*a* in determining a position or location of the UE 115-*a* within the coverage area 110-*a*. Based on the indication, the base station 105-*a* may configure signaling associated with the base station 105-*a*, or one or more neighboring base stations, such as the base station 105-*b*, or both. The configured signaling may include a PRS transmission on one or more resources of a channel associated with the communication link 205-*a* and one or more reporting levels for the UE 115-*a*. The one or more resources may correspond to PRS resources that may each span resource elements of consecutive PRBs within one or more OFDM symbols of a scheduled slot for transmission. As part of a multi-level resource setting, the one or more PRS resources may span a number of PRS resource sets that may each be associated with corresponding PRS resource settings (e.g., of the base station 105-*a* or a network entity), the one or more neighboring base stations (such as base station 105-*b*) or one or more TRPs associated with the base stations, or both.

The base station 105-*a* may transmit the PRS transmission as part of a downlink reference signaling to the UE 115-*a*. The base station 105-*a* may transmit the PRS resources on one or more directional beams, as part of a beam swept transmission. In some examples, a PRS resource is associated with time and frequency resources of one TRP. In some implementations, each PRS resource setting at the base station 105-*a* may support multiple ports for transmitting the PRS transmission over a set of configured transmit beams. As part of the multi-level resource setting, each PRS resource set of a PRS resource setting may contain one port for transmission within the slot. In some examples, a PRS resource set may be associated with one or more PRS resources of one TRP. In some examples, a PRS resource setting may contain multiple PRS resource set, where the PRS resource sets can be from one TRP or multiple TRPs. In some examples, a PRS resource setting may provide time resources and/or frequency resources in a layer different than another PRS resource setting. As such, the UE 115-*a* may operate according to the condition that the included PRS resources within each PRS resource set are associated with the same downlink spatial domain transmission filter and correspond to a single transmit beam at the base station 105-*a*.

The UE 115-*a* may receive the PRS transmission over the PRBs containing the one or more PRS resources. The UE 115-*a* may adjust (for example, sweep) one or more receive beams for reception of the one or more PRS resources. The PRS transmission may be configured so that the UE 115-*a* may measure and report one or more report parameters associated with the transmit and receive beam pairs of the reception. For example, the UE 115-*a* may receive the PRS transmission and determine the report parameter for each PRS resource included in the transmission. In some examples, the report parameter for each PRS resource may include one or more signal quality measurements of the received directional transmissions. For example, the UE 115-*a* may determine one or more of an RSRP, angle, PRS identification number, reference signal SNR, RSRQ, or the like as part of a report parameter determination for a PRS resource. In other examples, the UE 115-*a* may determine one or more timing measurements of the received directional transmissions. For example, the UE 115-*a* may determine one or more of a TOA, RSTD, or a UE Rx-Tx difference as part of a report parameter determination for a PRS resource.

Based on the multi-level resource setting of the received PRS transmission, the UE 115-*a* may determine a reporting configuration for transmitting position and location information to the base station 105-*a*. For example, the UE 115-*a* may support a multi-level reporting configuration for transmitting the one or more report parameters. In some examples, multi-level reporting configuration may support a granular reporting of the report parameters (which may include report quantities). Additionally or alternatively, the UE 115-*a* may support one or more generalized formats for transmitting one or more report parameters in response to the received PRS transmission.

For example, the UE 115-*a* may format the reporting at a resource level and transmit the report parameter for each PRS resource of the PRS transmission. In some implementations, the resource level reporting may be referred to as level 1 reporting at the UE 115-*a*. By determining a report parameter for each PRS resource of the PRS transmission, the UE 115-*a* may provide measurement information for multiple transmit/receive beam pairs of the PRS transmission. For example, for each assumed transmit beam of a PRS resource set the UE 115-*a* may provide measurements related to multiple receive beams, the measurements corresponding to report parameters for the included PRS resources of each PRS resource set.

In other examples, the UE 115-*a* may format the reporting at a set level, and transmit a selected report parameter for each PRS resource set corresponding or configured according to a PRS setting of the base station 105-*a*. In some implementations, the set level reporting may be referred to as level 2 reporting by the UE 115-*a*. By providing a selected report parameter for each PRS resource set of the PRS transmission, the UE 115-*a* may provide measurement information for different transmit beams associated with a PRS resource setting. The selected report parameter may be associated with the included PRS resources of each PRS resource set. For example, the UE 115-*a* may identify a report parameter associated with a PRS resource of a PRS resource set as the selected report parameter. The selected report parameter may be associated with a reference identification value for the level 2 reporting. In other examples, the UE 115-*a* may merge the measurements for multiple or, in some implementations, all transmit receive beam pairs of a PRS resource set and transmit a single report parameter based on merging the measurements.

As part of a level 1 or level 2 reporting, the UE 115-*a* may be configured for differential reporting associated with the report parameters. For example, the UE 115-*a* may identify a reference report parameter associated with a PRS resource (for level 1 reporting) or a PRS resource set of a configured PRS resource setting (for level 2 reporting). The UE 115-*a* may then determine one or more additional report parameters corresponding to PRS resources of a PRS resource set (for level 1 reporting) or PRS resource sets corresponding or configured according to a PRS resource setting (for level 2 reporting). The one or more additional report parameters (which may include report quantities) may be based on a measured difference relative to the reference report parameter. The differential reporting may decrease signaling overhead associated with transmitting the one or more report parameters.

In other examples, the UE 115-a may format the reporting at a setting level and transmit a selected report parameter for each PRS setting associated with the received PRS transmission. In some implementations, the setting level reporting may be referred to as level 3 reporting. By providing a selected report parameter for each PRS resource setting, the UE 115-a may provide measurement information for each configured setting that may include different transmit beams for one or more PRS resource sets. The selected report parameter may be associated with the included PRS resources of a PRS resource setting. For example, the UE 115-a may identify a report parameter associated with a PRS resource of a PRS resource set corresponding or configured according to a PRS setting as the selected report parameter. The selected report parameter may be associated with a reference identification value for the level 3 reporting. In other examples, the UE 115-a may merge the measurements for multiple or in some examples all transmit receive beam pairs of the one or more PRS resource settings and transmit a single report parameter based on merging the measurements.

In other examples, the UE 115-a may format the reporting generally for the base station 105-a and transmit a single selected report parameter in response to the received PRS transmission. In some implementations, the base station level reporting may be referred to as level 4 reporting. The selected report parameter may be associated with an included PRS resource of the PRS transmission. For example, the UE 115-a may identify a report parameter associated with a PRS resource of the one or more PRS resource sets included in the PRS transmission. The selected report parameter may be associated with a reference identification value for level 4 reporting. In other examples, the UE 115-a may merge the measurements for one or more if not all transmit receive beam pairs of the PRS resources and transmit a single report parameter based on merging the measurements.

The UE 115-a may transmit the one or more report parameters to base station 105-a according to the supported multi-level reporting on uplink shared channel resources of the channel. The multi-level configuration and reporting may include transmitting the one or more report parameters according to one of the configured reporting levels. Additionally or alternatively, in some examples, the UE 115-a may support multiple reporting levels on an inter-setting or intra-setting level. For example, the UE 115-a may configure a response that includes level 1 reporting for a subset of the one or more PRS resource sets included in a configured PRS resource setting and level 2 reporting for an additional subset of the one or more PRS resource sets.

In some examples, the UE 115-a may configure the transmission according to the capability for reporting measurements related to positioning at the UE 115-a, as indicated. In other examples, the UE 115-a may configure the transmission according to the subsequent indication by the base station 105-a and included with the received PRS transmission. In other examples, the UE 115-a may configure the transmission according to a positioning procedure or resource setting. For example, the UE 115-a may determine an available uplink shared channel resource size and adjust the reporting level for transmitting the one or more report parameters. In other examples, the UE 115-a may identify the total number of resources associated with the PRS transmission (such as the number of PRS resources in a PRS resource set, PRS sets in a PRS setting, PRS settings configured by the base station 105-b, or a number of additional base stations) and change the reporting level for transmitting the one or more report parameters.

For some positioning procedures (such as observed time difference of arrival (OTDOA) positioning, or angle of departure (AOD) positioning) different reporting levels may be configured by the UE 115-a. For example, for OTDOA-only positioning, the UE 115-a may provide one or more report parameters that include RSTD values and are configured according to level 3 or level 4 formatting of the response. Alternatively, for AOD based procedure, the UE 115-a may include angle or beam identification values in the one or more report parameters according to a level 1 or level 2 formatting of the response. Additionally or alternatively, if both downlink PRS transmission and uplink PRS transmission are configured as part of the communication over communication link 205-a, the resource setting for transmitting the one or more report parameters may be defined as a pair. For example, each resource setting pair may include a PRS resource setting for the downlink PRS transmission and an sounding reference signal (SRS) resource setting for uplink PRS transmission on the channel.

As described herein, the UE 115-a may support UE-assisted positioning techniques for each of the one or more base stations 105 or TRPs where the UE 115-a is within a supported coverage area 110. For example, similar to the multi-level reporting for positioning associated with the base station 105-a, the UE 115-a may transmit an indication (such as a configured reporting level) to the base station 105-b that includes a capability for reporting measurements related to positioning of the UE 115-a. The indication may be part of a UE-assisted positioning technique and aid the base station 105-b in determining a position or location of the UE 115-a (for example, within the coverage area 110-b).

The base station 105-b may configure a PRS transmission and an indication of a reporting level at the UE 115-a for the base station 105-b or one or more neighboring base stations. The PRS transmission may span on one or more resources of a channel associated with the communication link 205-b. As part of a multi-level resource setting, the one or more PRS resources may span a number of PRS resource sets that are each corresponding or configured according to a PRS resource setting at the base station 105-b or the one or more neighboring base stations.

Based on the multi-level resource setting of the received PRS transmission, the UE 115-a may determine a reporting configuration for the position and location information. The UE 115-a may support a multi-level reporting configuration for transmitting the one or more report parameters (which may be examples of report quantities). For example, the multi-level reporting options may include reporting the determined report parameters on one or more of a resource level (level 1), a set level (level 2), a setting level (level 3), or generally for at least some if not each base station of the communication (level 4). The UE 115-a may then transmit the one or more report parameters to the base station 105-b according to a determined reporting configuration.

In some examples, as part of a level 1 or level 2 reporting, the UE 115-a may be configured for differential reporting associated with the report parameters. For example, the UE 115-a may identify a reference report parameter associated with a PRS resource (for level 1 reporting) or a PRS resource set of a configured PRS resource setting (for level 2 reporting). The UE 115-a may then determine one or more additional report parameters corresponding to PRS resources of a PRS resource set (for level 1 reporting) or PRS resource sets corresponding or configured according to a PRS resource setting (for level 2 reporting) based on a measured difference relative to the reference report parameter.

In other examples, as part of a level 3 or level 4 reporting, the UE 115-*a* may determine a differential for measuring one or more timing values (such as RSTD) associated with the one or more report parameters. For example, base station 105-*b* may support multiple PRS settings as part of the PRS transmission. As such, the UE 115-*a* may determine one or more RSTD values (for level 3 reporting) by determining the difference between measured TOA values for transmit and receive beam pairs associated with each of the one or more PRS settings. Similarly, the UE 115-*a* may use the measured values for each of base stations 105-*a* and 105-*b* to determine an RSTD value (for level 4 reporting). For example, the UE 115-*a* may determine one or more RSTD values according to the difference between a measured TOA value for a configured PRS setting of the base station 105-*a* and a measured TOA value for a configured PRS setting of the base station 105-*b*.

For some positioning procedures (such as observed time difference of arrival (OTDOA) positioning, or angle of departure (AOD) positioning) different reporting levels may be configured by the UE 115-*a*. For example, for OTDOA-only positioning, the UE 115-*a* may provide one or more report parameters that include RSTD values and are configured according to level 3 or level 4 formatting of the response. Alternatively, for AOD based procedure, the UE 115-*a* may include angle and beam identification values in the one or more report parameters according to a level 1 or level 2 formatting of the response. Additionally or alternatively, if both downlink PRS transmission and uplink PRS transmission are configured as part of the communication over communication link 205-*b*, the resource setting for transmitting the one or more report parameters may be defined as a pair.

Based on the received one or more report parameters, each of the base stations 105-*a* and 105-*b* may determine positioning and location information related to the UE 115-*a*. The determined positioning information may support various location services provided by network resources on the communication links 205, including various location services such as navigation systems or emergency communications. In addition, the determined position and location information of the UE 115-*a* may supplement one or more additional location systems supported by the UE 115-*a* (such as GPS technology). The multi-level configuration and reporting by the UE 115-*a* may improve indication robustness between the UE 115-*a* and each of the base stations 105-*a*.

Figure 3:
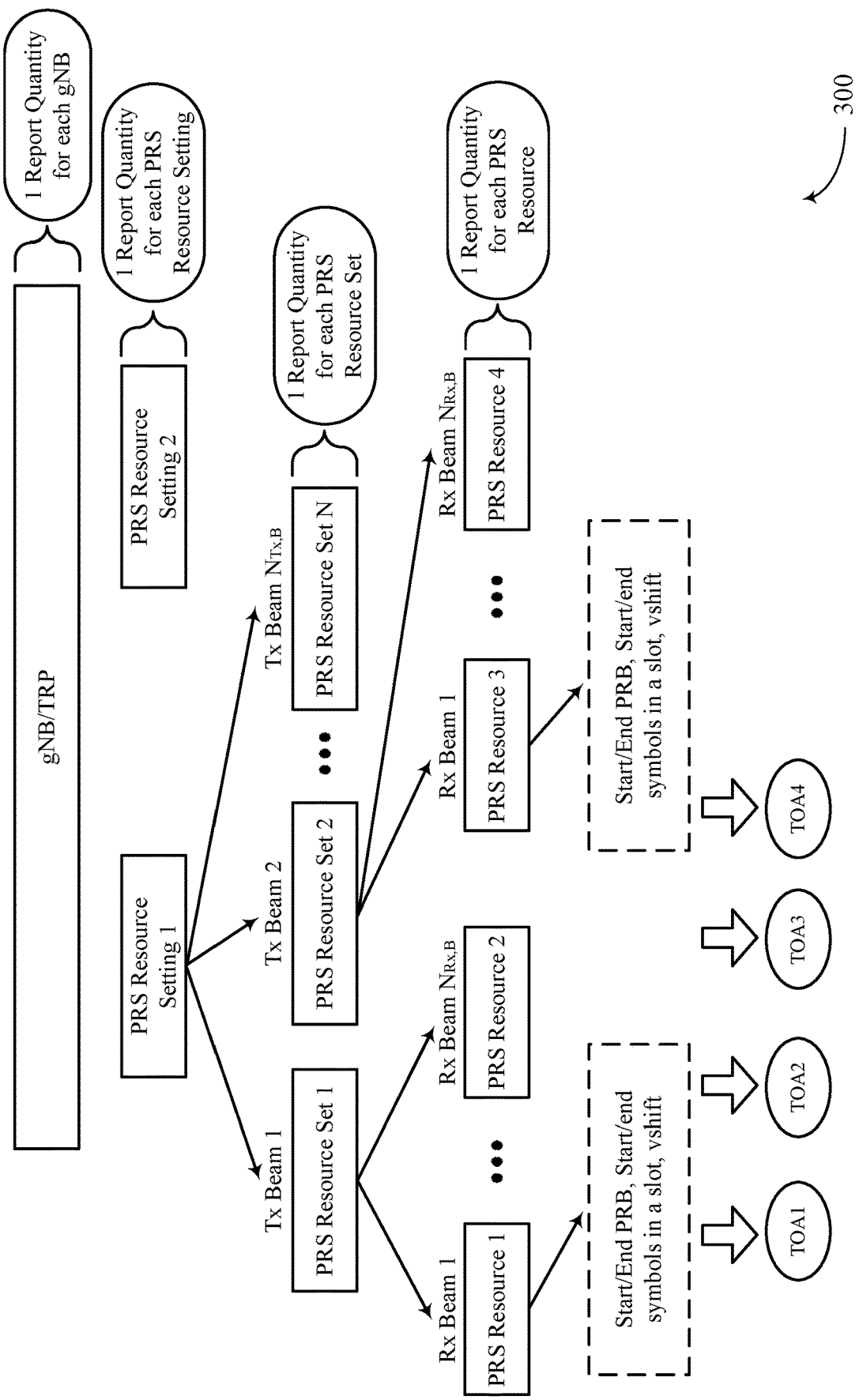
FIG. 3 illustrates an example of a reporting level architecture that supports multi-level configuration and reporting for positioning in NR systems in accordance with aspects of the present disclosure.

FIG. 3 illustrates an example of a reporting level architecture 300 that supports multi-level configuration and reporting for positioning in new radio in accordance with aspects of the present disclosure. The reporting level architecture 300 may be implemented by a UE as part of UE assisted positioning, as described with reference to FIGS. 1 and 2. The reporting level architecture 300 may include one or more settings or reporting levels for multi-level reporting and transmitting report parameters to indicate UE positioning.

As described herein, a UE may receive a PRS transmission from a base station. The PRS transmission may span a number of PRS resource sets that are each corresponding or configured according to a PRS resource setting at the base station. The PRS transmission may be configured so that the UE may determine and report one or more report parameters associated with the transmit and receive beam pairs of the reception. In some examples, the report parameter for each PRS resource may include one or more signal quality measurements of the received directional transmissions. For example, the UE may determine one or more of an RSRP, angle, PRS identification number, reference signal SNR, RSRQ, or the like as part of a report parameter determination for a PRS resource. In other examples, the UE 115-*a* may determine one or more timing measurements of the received directional transmissions. For example, the UE may determine one or more of a TOA, RSTD, or a UE Rx-Tx difference as part of a report parameter determination for a PRS resource. The UE may additionally or alternatively determine any quantity or combination of report parameters, which may include report parameters.

Based on the multi-level resource setting of the received PRS transmission, the UE may determine a reporting configuration for transmitting position and location information to the base station. For example, the UE may support a multi-level reporting configuration for transmitting the one or more report parameters. In some examples, multi-level reporting configuration may support a granular reporting of the report parameters. Additionally or alternatively, the UE may support one or more generalized formats for transmitting one or more report parameters.

In some examples, the UE may format the reporting generally for the base station and transmit a single report parameter in response to the received PRS transmission. For example, the UE may select a single report parameter to indicate relevant measurements for each transmit and receive beam pair associated with the one or more configured PRS resource settings of the received PRS transmission. The selected report parameter may be associated with an included PRS resource of the PRS transmission. For example, the UE may identify a report parameter associated with a PRS resource of the one or more PRS resource sets included in the PRS transmission. The selected report parameter may be associated with a reference identification value for the reporting level. In other examples, the UE may merge the measurements for all transmit receive beam pairs of the PRS resources and transmit a single report parameter based on merging the measurements.

As part of the reporting, the UE may determine a difference for measuring one or more timing values (such as RSTD) associated with the selected report parameter. For example, the UE may determine an RSTD value by determining the difference between measured TOA values for one or more configured PRS resource settings of and measured TOA values for one or more additional base stations that support communication with the UE. The UE may then format the selected report parameter to include the determined RSTD value associated with the measured difference.

In some examples, the UE may format the reporting at a setting level and transmit a selected report parameter for each PRS resource setting associated with the received PRS transmission. By providing a selected report parameter for each PRS resource setting, the UE may provide measurement information associated with the one or more supported transmit beams for each PRS resource setting. For example, the UE may provide a selected report parameter for a first PRS Resource setting (for example, PRS Resource Setting 1) associated with one or more transmit beams including Tx Beam 1, Tx Beam 2, and up to Tx Bean $N_{TX,B}$. The selected report parameter for PRS Resource Setting 1 may include a reporting associated with one or more PRS resource sets (for example, PRS Resource Set 1, PRS Resource Set 2, up to PRS Resource Set N).

The selected report parameter may be associated with an included PRS resources for each PRS resource setting. For example, the UE may identify a report parameter associated with a PRS resource of a PRS resource set corresponding or configured according to a PRS setting as the selected report parameter. The selected report parameter may be associated with a reference identification value. In other examples, the a may merge the measurements for all transmit receive beam pairs of the one or more PRS resource settings and transmit a single report parameter for each PRS resource setting based on merging the measurements.

As part of the reporting, the UE may determine a difference for measuring one or more timing values (such as RSTD) associated with the selected report parameter. For example, the UE may determine an RSTD value by determining the difference between measured TOA values for transmit and receive beam pairs associated with each of the one or more PRS settings. The UE may format the selected report parameter to include the determined RSTD value associated with the measured difference.

In some examples, the UE may format the reporting at a set level and transmit a selected report parameter for each PRS resource set corresponding or configured according to a PRS resource setting of the base station. As part of the reporting, the UE may assume that the included PRS resources within each received PRS resource set are associated with the same downlink spatial domain transmission filter and correspond to a single transmit beam at the base station. By providing a selected report parameter for each PRS resource set, the UE may provide measurement information for one or more receive beams (for example, a receive beam sweep) in relation to each assumed transmit beam. For example, the UE may provide a selected report parameter for each PRS resource set (for example, PRS Resource Set 1, PRS Resource Set 2, up to PRS Resource Set N) corresponding or configured according to PRS Resource Setting 1. Each of the PRS resource sets may be associated with one or more receive beams (for example, Rx beam 1 up to Rx beam $N_{RX,B}$).

The selected report parameter may be associated with the included PRS resources of each PRS resource set. For example, the UE may identify a report parameter associated with a PRS resource of a PRS resource set as the selected report parameter. The selected report parameter may be associated with a reference identification value. In other examples, the UE may merge the measurements for all transmit receive beam pairs of a PRS resource set and transmit a single report parameter based on merging the measurements.

As part of the reporting, the UE may be configured for differential reporting associated with the report parameters. For example, the UE may identify a reference report parameter associated with a PRS resource set of a configured PRS resource setting. The UE may then determine one or more additional report parameters corresponding to one or more additional PRS resource sets of the PRS resource setting. The one or more additional report parameters may be based on a measured difference relative to the reference report parameter. The differential reporting may decrease signaling overhead associated with transmitting the one or more report parameters.

In some examples, the UE may format the reporting at a resource level and transmit a report parameter for each PRS resource associated with the received PRS transmission. As part of the reporting, the UE may sweep a receive beam for each PRS resource. Each PRS resource of the PRS transmission may be associated with a port for transmission in the slot and may have a configured periodicity and slot offset.

For example, a first receive beam (for example, Rx beam 1) may receive a PRS resource (for example, PRS resource 1) over the slot associated with the PRS transmission. PRS resource 1 may be associated with a port for transmission at the base station and transmitted according to a configured periodicity and slot offset. Based on the receiving, the UE may identify a start and end time for the one or more PRBs carrying the PRS resource 1, a start and end time for one or more symbols in the slot, and one or more parameters (for example, vshift) for determining frequency positioning of signaling associated with PRS resource 1. The UE may then determine one or more signal quality measurements or timing measurements (such as a TOA1, as shown) associated with a report parameter determination for PRS resource 1.

Similarly, in other examples, the first receive beam (for example, Rx beam 1) may receive a subsequent PRS resource (for example, PRS resource 3) as part of an additional PRS resource set of the PRS transmission. Based on the receiving, the UE may identify a start and end time for the one or more PRBs carrying the PRS resource 3, a start and end time for one or more symbols in the slot, and one or more parameters (for example, vshift) for determining frequency positioning of signaling associated with PRS resource 3. The UE may then determine one or more signal quality measurements or timing measurements (such as a TOA3, as shown) associated with a report parameter determination for PRS resource 3. By determining a report parameter for each PRS resource of the PRS transmission, the UE may provide measurement information for multiple transmit/receive beam pairs of the PRS transmission. For example, for each assumed transmit beam of a PRS resource set the UE may provide measurements related to multiple receive beams, the measurements corresponding to report parameters (such as TOA2, TOA4, etc.) for the included PRS resources of each PRS resource set.

Additionally or alternatively, the UE may be configured for differential reporting associated with the report parameters. For example, the UE may identify a reference report parameter associated with a PRS resource included in PRS resource set. The UE may then determine one or more additional report parameters corresponding to one or more additional PRS resources of the PRS resource set. The one or more additional report parameters may be based on a measured difference relative to the reference report parameter. The differential reporting may decrease signaling overhead associated with transmitting the one or more report parameters.

Figure 4:
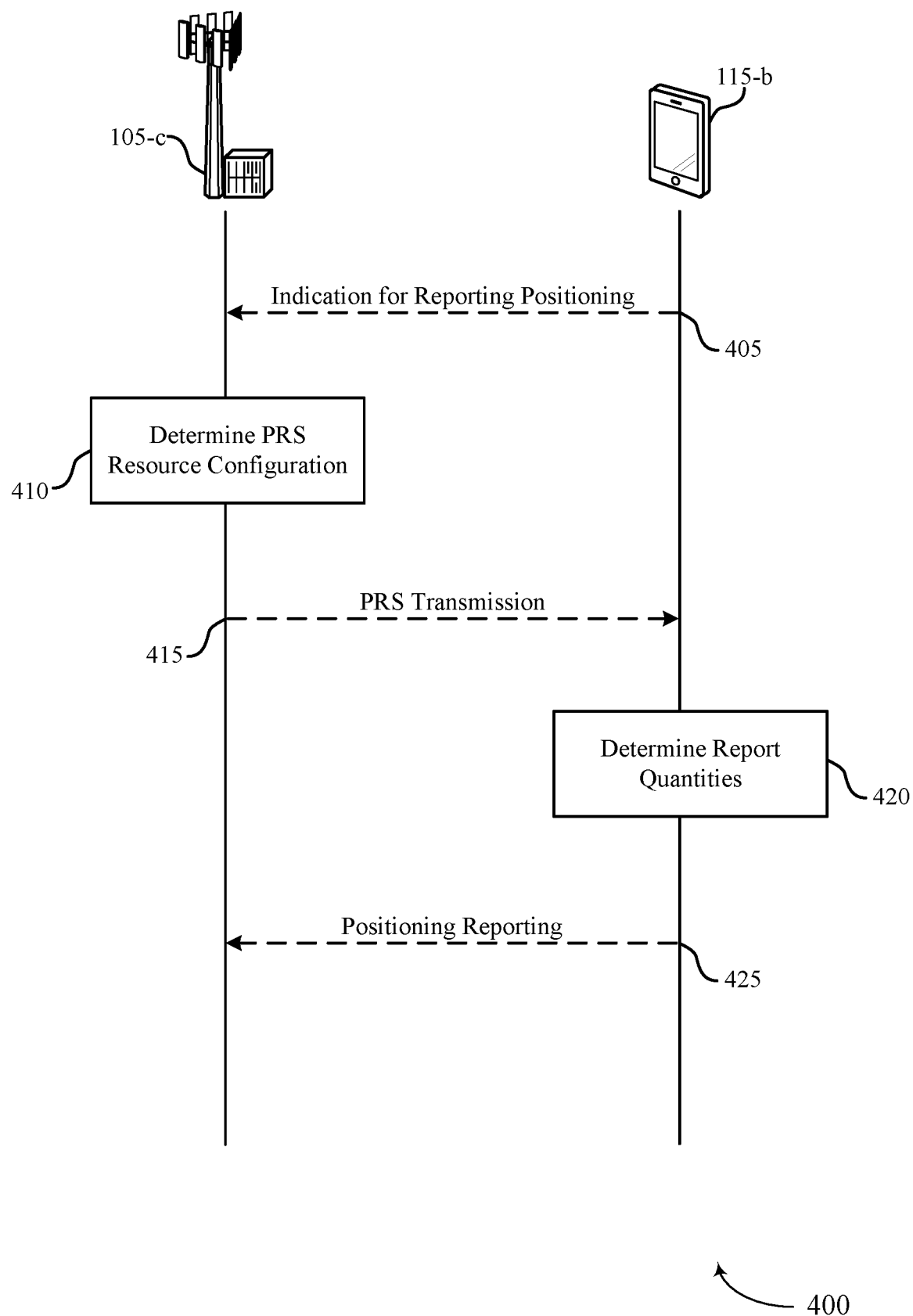
FIG. 4 illustrates an example of a process flow that supports multi-level configuration and reporting for positioning in NR systems in accordance with aspects of the present disclosure.

FIG. 4 illustrates an example of a process flow 400 that supports multi-level configuration and reporting for positioning in new radio in accordance with aspects of the present disclosure. The process flow 400 may include operations by a UE 115-b and a base station 105-c, which may be examples of the corresponding devices described with reference to FIGS. 1-3. The base station 105-c may correspond to a network entity, a serving base station, or a neighboring base station for the UE 115-b. The process flow 400 may include aspects for multi-level configuration and reporting associated with UE positioning and location information. Alternative examples of the following may be implemented, where some steps may be performed in a different order than described or not performed at all. In some implementations, steps may include additional features not mentioned below, or further steps may be added.

At 405, the UE 115-*b* may transmit an indication to the base station 105-*c* that includes a capability for the UE 115-*b* to report location and positioning information. The indication may correspond to a configured reporting level at the UE 115-*b* and may be part of a UE-assisted positioning technique. For example, the indication may include a configuration at the UE 115-*b* for determining report parameters associated with the positioning on a resource level, a set level, a setting level, or generally for the base station 105-*c*.

At 410, the base station 105-*c* may receive the indication transmission from the UE 115-*b*. In some examples, the base station 105-*c* may route the indication to a location management function (LMF) in communication with base station 105-*c*. Based on the indication, the base station 105-*c* and/or LMF may determine (or identify) a configuration for performing PRS transmission. For example, base station 105 *c* and/or LMF may identify the configuration for performing PRS transmission from a lookup table (or similar data structure, indexing operation, etc.) responsive to the received indication. The PRS transmission may be associated with the base station 105-*c* or one or more neighboring base stations that support communication with the UE 115-*b*. The configuration may correspond to a multi-level resource setting that includes one or more PRS resources spanning a number of PRS resource sets that are each corresponding or configured according to a PRS resource setting at the base station 105-*c*. That is, in some cases, UE 115-*b* may determine which of the one or more reporting levels to use based on the received configuration without the one or more reporting levels having to be explicitly signaled or communicated by the base station 105-*c* and/or LMF. In addition, the configuration may include an indication for one or more reporting levels at the UE 115-*b* and the one or more neighboring base stations.

At 415, the base station 105-*c* may transmit the PRS transmission over one or more symbols of a configured slot and as part of a downlink reference signaling to the UE 115-*b*. The base station 105-*c* may transmit the PRS transmission via an associated TRP and may transmit the one or more PRS resources of the PRS transmission on one or more directional beams, as part of a beam swept transmission. For example, each PRS resource setting at the base station 105-*c* may support multiple ports for transmitting the PRS transmission over a set of configured transmit beams. As part of the multi-level resource setting, each PRS resource set of a PRS resource setting may contain one port for transmission within the slot.

At 420, the UE 115-*b* may receive the one or more PRS resources of the PRS transmission over PRBs of the slot. The UE 115-*b* may assume the included PRS resources within each PRS resource set are associated with the same downlink spatial domain transmission filter and correspond to a single transmit beam at the base station 105-*c*. The PRS transmission may be configured so that the UE 115-*b* may measure and/or calculate and report one or more report parameters associated with the transmit and receive beam pairs of the reception. For example, the UE 115-*b* may receive the PRS transmission and determine the report parameter for each PRS resource included in the transmission.

At 425, the UE 115-*b* may transmit the one or more report parameters to the base station 105-*c* and, in some examples, the base station 105-*c* may route the one or more report parameters to the LMF as based on the determined reporting configuration. For example, the UE 115-*b* may format the reporting at a resource level and transmit the report parameter for at least one PRS resource of the PRS transmission. In other examples, the UE 115-*b* may format the reporting at a set level, and transmit a selected report parameter for each PRS resource set corresponding or configured according to a PRS setting of the base station 105-*c*. In other examples, the UE 115-*b* may format the reporting at a setting level and transmit a selected report parameter for at least one positioning reference signal setting of the PRS transmission. In other examples, the UE 115-*b* may format the reporting at a base station level, and transmit a report parameter to the base station 105-*c*.

The base station 105-*c* may receive the one or more report parameters and the base station 105-*c* and/or LMF may determine positioning and location information related to the UE 115-*b*.

Figure 5:
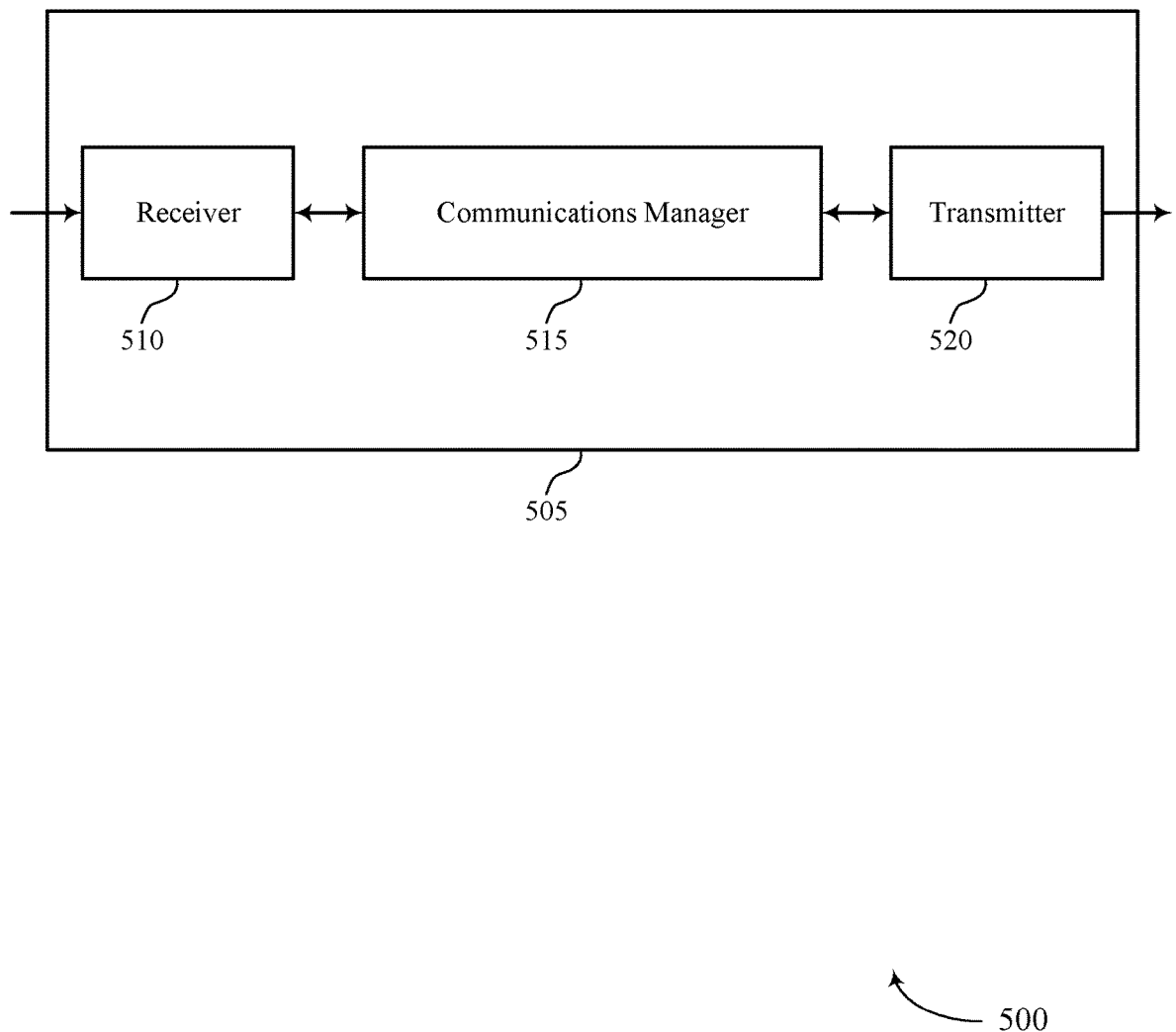
FIGS. 5 and 6 show block diagrams of devices that support multi-level configuration and reporting for positioning in NR systems in accordance with aspects of the present disclosure.

FIG. 5 shows a block diagram 500 of a device 505 that supports multi-level configuration and reporting for positioning in new radio in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (for example, via one or more buses).

The receiver 510 may receive information such as packets, user data, or control information associated with various information channels (for example, control channels, data channels, and information related to multi-level configuration and reporting for positioning in new radio, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may initiate or generate for transmission by the transmitter 520 or a transceiver, to a base station or network entity, an indication of a capability for reporting measurements related to positioning of the UE. The communications manager 515 may receive (e.g., obtain via the receiver 510 or a transceiver), from the base station or network entity based on the indication, signaling including one or more configurations associated with one or more TRPs, the one or more configurations including one or more positioning reference signal resources and one or more reporting levels for the UE including a first reporting level for the UE. The communications manager 515 may determine, based on the one or more configurations, one or more report parameters associated with the positioning of the UE. The communications manager 515 may initiate or generate for transmission, to the base station or network entity based on the one or more configurations, the one or more report parameters using the first reporting level for the UE or a second reporting level for the UE that is different than the first reporting level. The communications manager 515 may be an example of aspects of the communications manager 810 described herein.

The actions performed by the communications manager 515 as described herein may be implemented to realize one or more potential advantages. One implementation may allow a UE 115 to lower signaling or information overhead by allowing the UE 115 to report relevant resource level measurements for different beam pairs and/or relevant set level measurements for different transmit beams after the UE 115 merges measurements performed across receive beams on the same transmit beam. Another implementation may provide improved quality and reliability of service at the UE 115, as latency and the number of separate resources allocated to the UE 115 may be reduced.

The communications manager 515, or its sub-components, may be implemented in hardware, code (for example, software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at different locations, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Based on configuring at least one reporting level for resource feedback and a different reporting level for resource set feedback that provides a more efficient signaling and lower latency than a second service, a processor of a UE 115 (e.g., controlling the receiver 510, the transmitter 520, or the transceiver 820 as described with reference to FIG. 8) may efficiently determine the position of the UE 115. Further, the processor of UE 115 may transmit one or more measurement reports using additional reporting levels (e.g., frequency level or base station 105 specific) that indicates additional information. The processor of the UE 115 may turn on one or more processing units for measurement and reporting of reference signals, or a similar mechanism within the UE 115. As such, when the reference signal (e.g., PRS) is received, the processor may be ready to respond more efficiently through the reduction of a ramp up in processing power.

Figure 6:
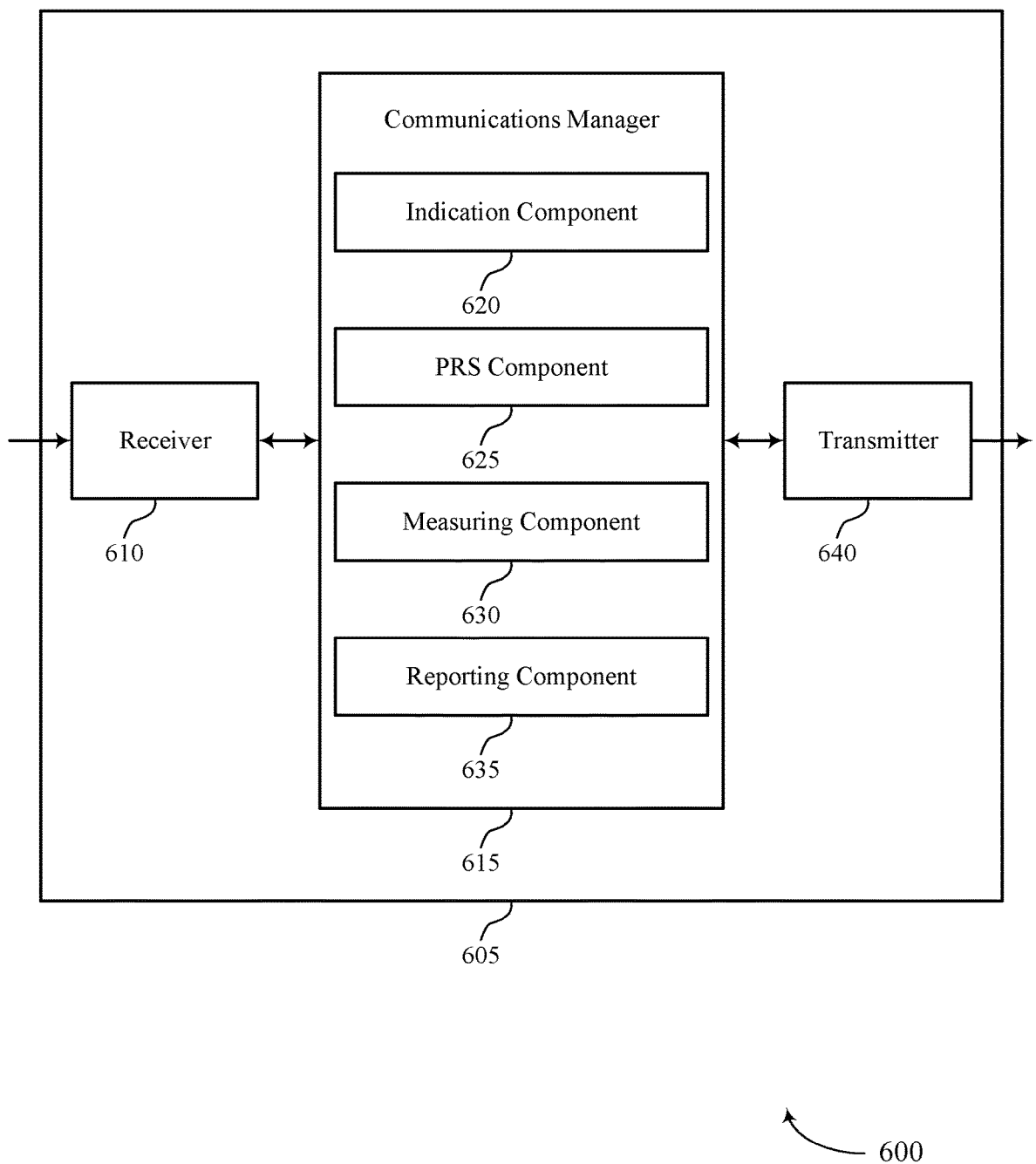

FIG. 6 shows a block diagram 600 of a device 605 that supports multi-level configuration and reporting for positioning in new radio in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (for example, via one or more buses).

The receiver 610 may receive information such as packets, user data, or control information associated with various information channels (for example, control channels, data channels, and information related to multi-level configuration and reporting for positioning in new radio, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an indication component 620, a PRS component 625, a measuring component 630, and a reporting component 635. The communications manager 615 may be an example of aspects of the communications manager 810 described herein.

The indication component 620 may transmit, to a base station or network entity, an indication of a capability for reporting measurements related to positioning of the UE.

The PRS component 625 may receive, from the base station or network entity based on the indication, signaling including one or more configurations associated with one or more TRPs, the one or more configurations including one or more positioning reference signal resources and one or more reporting levels for the UE including a first reporting level for the UE.

The measuring component 630 may determine, based on the one or more configurations, one or more report parameters associated with the positioning of the UE. In some examples, measuring component 630 may communicate with a positioning engine (e.g., an application processor or a sensor processor of the UE) that is separate from the communications manager 615. For example, the measuring component 630 may provide measurement information to the positioning engine, which may transmit a computed position or similar positioning information (e.g., whether a particular beam is in a line-of-sight (LoS) condition or a non-line-of-sight (NLoS)) back to the measuring component 630 as input used to determine the one or more reporting parameters, the reporting level, or both.

The reporting component 635 may transmit, to the base station or network entity based on the one or more configurations, the one or more report parameters using the positioning of the UE with the first reporting level for the UE or a second reporting level for the UE that is different than the first reporting level.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
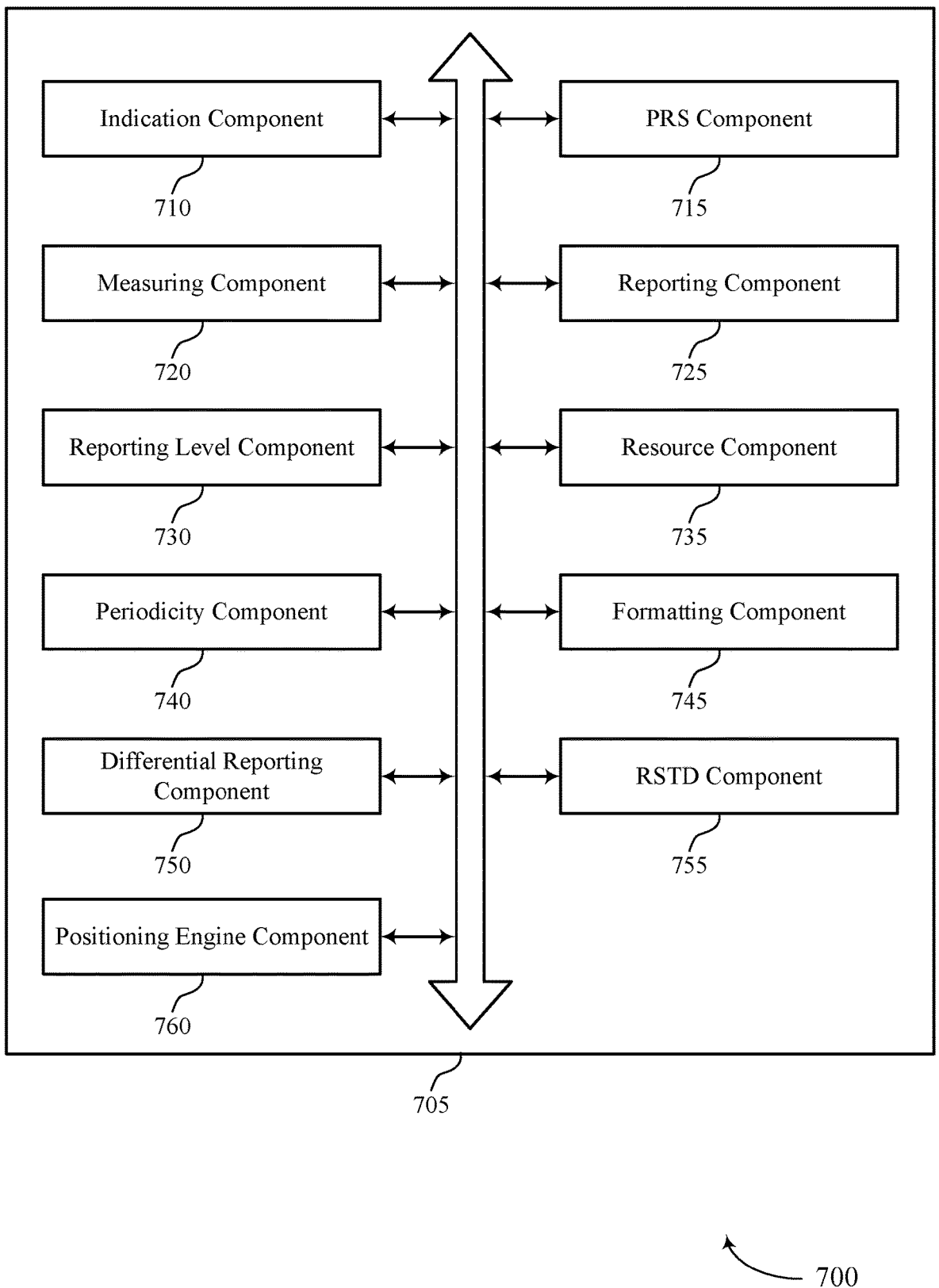
FIG. 7 shows a block diagram of a communications manager that supports multi-level configuration and reporting for positioning in NR systems in accordance with aspects of the present disclosure.

FIG. 7 shows a block diagram 700 of a communications manager 705 that supports multi-level configuration and reporting for positioning in new radio in accordance with aspects of the present disclosure. The communications manager 705 may be an example of aspects of a communications manager 515, a communications manager 615, or a communications manager 810 described herein. The communications manager 705 may include an indication component 710, a PRS component 715, a measuring component 720, a reporting component 725, a reporting level component 730, a resource component 735, a periodicity component 740, a formatting component 745, a differential reporting component 750, a RSTD component 755, and a positioning engine component 760. Each of these modules may communicate, directly or indirectly, with one another (for example, via one or more buses).

The indication component 710 may transmit, to a base station or network entity, an indication of a capability for reporting measurements related to positioning of the UE.

The PRS component 715 may receive, from the base station or network entity based on the indication, signaling including one or more configurations associated with one or more TRPs, the one or more configurations including one or more positioning reference signal resources and one or more reporting levels for the UE.

In some examples, identifying one or more of: a number of the one or more positioning reference signal resources included in a positioning reference resource set, a number of positioning reference resource sets corresponding or configured according to a positioning reference signal resource setting of the base station, a number of positioning reference signal resource settings, or a number of additional base stations, where transmitting the one or more report parameters includes transmitting, based on the identifying, the one or more report parameters using the second reporting level for the UE that is different than the first reporting level.

In some examples, identifying one or more of a positioning procedure of the UE or a reporting parameter for transmitting the one or more report parameters where transmitting the one or more report parameters includes transmitting, based on the identifying, the one or more report parameters using the second reporting level for the UE that is different than the first reporting level. In some examples, the one or more base stations include the base station and one or more neighboring base stations.

The measuring component 720 may determine, based on the one or more configurations, one or more report parameters associated with the positioning of the UE. In some cases, determining the one or more report parameters may include determining a report parameter for at least one positioning reference signal resource of the one or more positioning reference signal resources.

The reporting component 725 may transmit, to the base station or network entity based on the one or more configurations, the one or more report parameters. In some examples, transmitting the one or more report parameters may include transmitting, using the second reporting level for the UE, a selected report parameter for at least one positioning reference signal resource set of one or more positioning reference signal resource sets.

In some examples, determining, based on the signaling, one or more additional report parameters associated with the positioning of the UE that are configured according to a third reporting level for the UE, where transmitting the one or more report parameters includes transmitting the one or more report parameters corresponding to a first subset of the one or more positioning reference signal resources and transmitting the one or more additional report parameters corresponding to a second subset of the one or more positioning reference signal resources.

In some examples, the one or more report parameters may correspond to one or more report quantities, including one or more of a time of arrival, a reference signal time difference, a reference signal receive power, an angle, a PRS identification number, a reception to transmission difference, a signal-to-noise ratio, or a reference signal receive quality.

The reporting level component 730 may receive the one or more configurations associated with the one or more base stations includes receiving a first reporting level for the UE, and where transmitting the one or more report parameters includes transmitting, based on the one or more configurations, the one or more report parameters using the first reporting level for the UE or a second reporting level for the UE that is different than the first reporting level. In some examples, determining the one or more report parameters associated with the positioning of the UE includes determining the second reporting level for the UE.

In some examples, the reporting level component 730 may determine whether the UE is configured for transmitting the one or more report parameters using the first reporting level.

In some examples, determining the one or more report parameters associated with the positioning of the UE includes determining the one or more report parameters associated with the positioning of the UE configured according to the second reporting level different than the first reporting level based on determining whether the UE is configured for transmitting the one or more report parameters using the first reporting level.

The resource component 735 may determine an available resource size for transmitting the one or more report parameters, where transmitting the one or more report parameters includes transmitting, based on determining the available resource size, the one or more report parameters using the second reporting level for the UE that is different than the first reporting level.

The periodicity component 740 may determine that one or more of the first reporting level for the UE or the second reporting level for the UE are based on a periodicity of the transmitting the indication.

The formatting component 745 may determine a report parameter for each (or at least one) positioning reference signal resource of the one or more positioning reference signal resources, the one or more positioning reference signal resources spanning one or more positioning reference signal resource sets, the one or more positioning reference signal resource sets corresponding to one or more positioning reference signal resource settings.

In some examples, the formatting component 745 may transmit the report parameter for each (or at least one) positioning reference signal resource included in the one or more positioning reference signal resource sets using a first reporting level for the UE. In some examples, the first reporting level for the UE is the same as a reporting level of the one or more reporting levels for the UE.

In some examples, the formatting component 745 may transmit, using a second reporting level for the UE, a selected report parameter for each (or at least one) positioning reference signal resource set of the one or more positioning reference signal resource sets that are each corresponding or configured according to a positioning reference signal resource setting of the one or more positioning reference signal resource settings. In some examples, the second reporting level for the UE is the same as a reporting level of the one or more reporting levels for the UE indicated by the signaling comprising the one or more configurations. In some examples, the formatting component 745 may transmit the selected report parameter for each positioning reference signal resource set is based on a combining of the report parameter for each positioning reference signal resource included in a positioning reference signal resource set corresponding or configured according to the positioning reference signal resource setting.

In some examples, the formatting component 745 may transmit, using a third reporting level for the UE, a selected report parameter for each positioning reference signal resource setting of the one or more positioning reference signal resource settings that each configure a subset of the one or more positioning reference signal resource sets. In some examples, the third reporting level for the UE is the same as a reporting level of the one or more reporting levels for the UE. In some examples, the formatting component 745 may transmit the selected report parameter for each positioning reference signal resource setting is based on a combining of the report parameter for each positioning reference signal resource included in the subset of the one or more positioning reference signal resource sets.

In some examples, the formatting component 745 may transmit, using a fourth reporting level for the UE, a selected report parameter for one or more base stations including the base station. In some examples, the fourth reporting level for the UE is the same as a reporting level of the one or more reporting levels for the UE.

In some examples, the formatting component 745 may transmit the selected report parameter for the base station is based on a combining of the report parameter for the one or more positioning reference signal resources.

In some examples, the selected report parameter for each positioning reference signal resource set corresponds to a positioning reference signal resource that is included in a positioning reference signal resource set corresponding or configured according to the positioning reference signal resource setting and is associated with a configured reference identification value. In some examples, the selected report parameter for each positioning reference signal resource setting corresponds to a positioning reference signal resource that is included in the subset of the one or more positioning reference signal resource sets and is associated with a configured reference identification value. In some examples, the selected report parameter for the base station corresponds to a positioning reference signal resource of the one or more positioning reference signal resources and is associated with a configured reference identification value.

The differential reporting component 750 may identify a reference report parameter associated with a positioning reference signal resource included in a positioning reference signal resource set of the one or more positioning reference signal resource sets.

In some examples, the differential reporting component 750 may determine, based on the identifying, a differential between the reference report parameter and the report parameter for each additional reference signal resource included in the positioning reference signal resource set, where transmitting the report parameter for each positioning reference signal resource is based on determining the differential.

In some examples, the differential reporting component 750 may identify a reference report parameter associated with a positioning reference signal resource set of the one or more positioning reference signal resource sets associated with the corresponding positioning reference signal resource setting.

In some examples, the differential reporting component 750 may determine, based on the identifying, a differential between the reference report parameter and the report parameter for each additional reference signal resource set corresponding or configured according to the positioning reference signal resource setting, where transmitting the selected report parameter for each positioning reference signal resource set is based on determining the differential.

The RSTD component 755 may determine a reference signal time difference between a first time of arrival associated with a first positioning reference signal resource setting of the one or more positioning reference signal resource settings and a second time of arrival associated with a second positioning reference signal resource setting of the one or more positioning reference signal resource settings, where transmitting the selected report parameter for each positioning reference signal resource setting includes transmitting the reference signal time difference.

In some examples, determining a reference signal time difference between a first time of arrival associated with the base station and a second time of arrival associated with a second base station, where transmitting the selected report parameter for the base station includes transmitting the reference signal time difference.

The positioning engine component 760 may compute a position of the UE from measurement information (e.g., from a the measuring component 720, etc.). In some examples, the positioning engine component 760 may compute one or more report parameters associated with the positioning of the UE. In some cases, the positioning engine component 760 may be an application processor or a sensor processor. In some cases, the positioning engine component 760 may transmit the computed position to the reporting component 725 as input used to determine one or more reporting parameters, the reporting level, or both.

Figure 8:
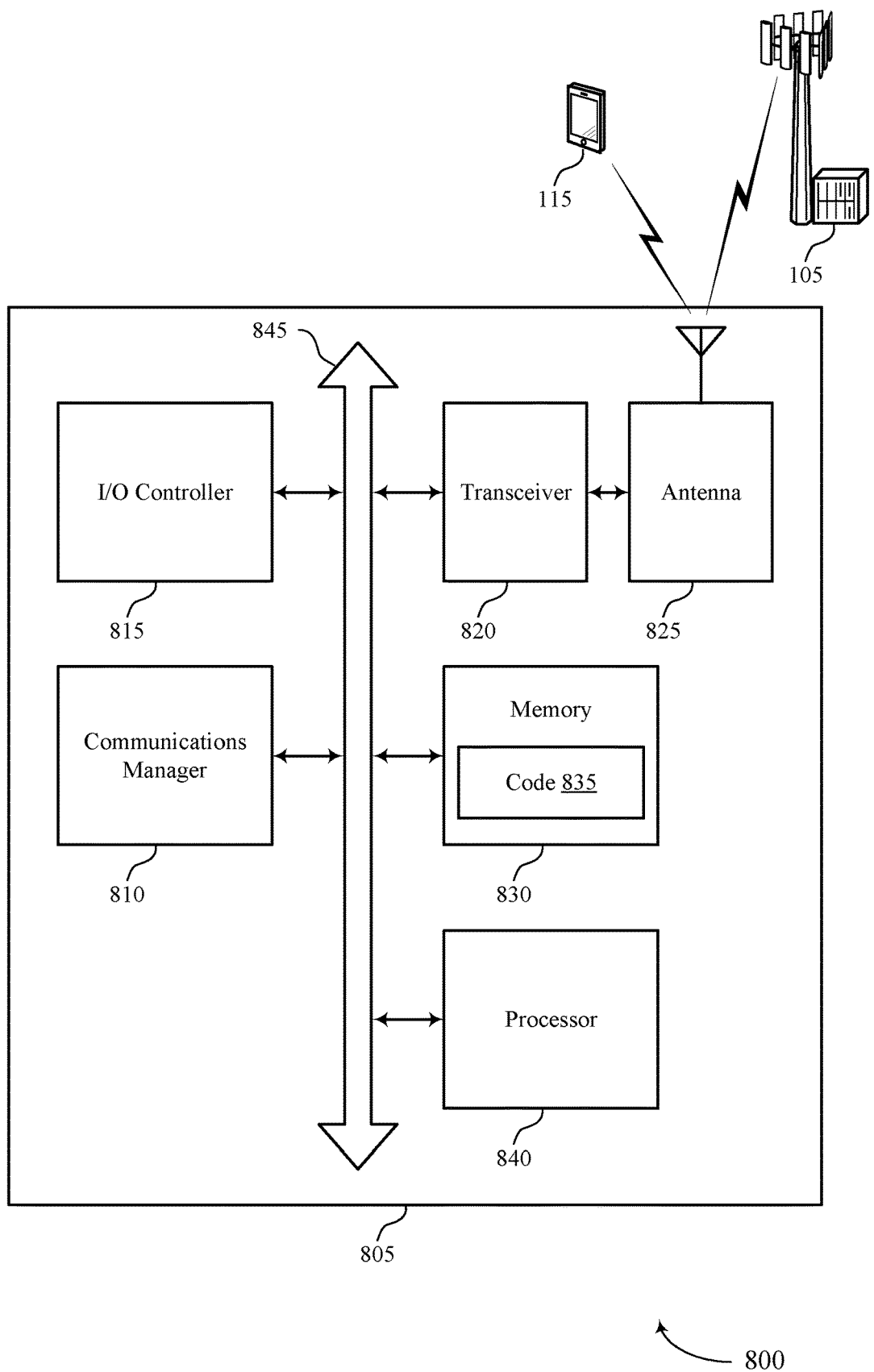
FIG. 8 shows a diagram of a system including a device that supports multi-level configuration and reporting for positioning in NR systems in accordance with aspects of the present disclosure.

FIG. 8 shows a diagram of a system 800 including a device 805 that supports multi-level configuration and reporting for positioning in new radio in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (for example, bus 845).

The communications manager 810 may initiate or generate for transmission by the transceiver 820, to a base station, an indication of a capability for reporting measurements related to positioning of the UE, receive, from the base station based on the indication, signaling including one or more configurations associated with one or more base stations, the one or more configurations including one or more positioning reference signal resources and one or more reporting levels for the UE, determine, based on the one or more configurations, one or more report parameters associated with the positioning of the UE, and transmit, to the base station based on the one or more configurations, the one or more report parameters.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic input/output system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

The processor 840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting multi-level configuration and reporting for positioning in new radio).

In some examples, means for transmitting, to a network entity, an indication of a capability for reporting measurements related to positioning of the UE, may be performed by transmitter 520, transmitter 640, or transceiver 820, as described herein. In some examples, means for receiving, from the network entity based at least in part on the indication, signaling comprising one or more configurations associated with one or more TRPs, the one or more configurations comprising one or more positioning reference signal resources, may be performed by receiver 510, receiver 610, or transceiver 820, as described herein. In some examples, means for determining, based at least in part on the one or more configurations, one or more report parameters associated with the positioning of the UE, communications manager 515 and a positioning engine, communications manager 615 and a positioning engine, measuring component 720 and positioning engine component 760 of communications manager 705 and a positioning engine, or communications manager 810 and a positioning engine, as described herein. In some examples, means for transmitting, to the network entity based at least in part on the one or more configurations, the one or more report parameters using a first reporting level for the UE or a second reporting level for the UE that is different than the first reporting level, may be performed by transmitter 520, transmitter 640, or transceiver 820, as described herein.

Figure 9:
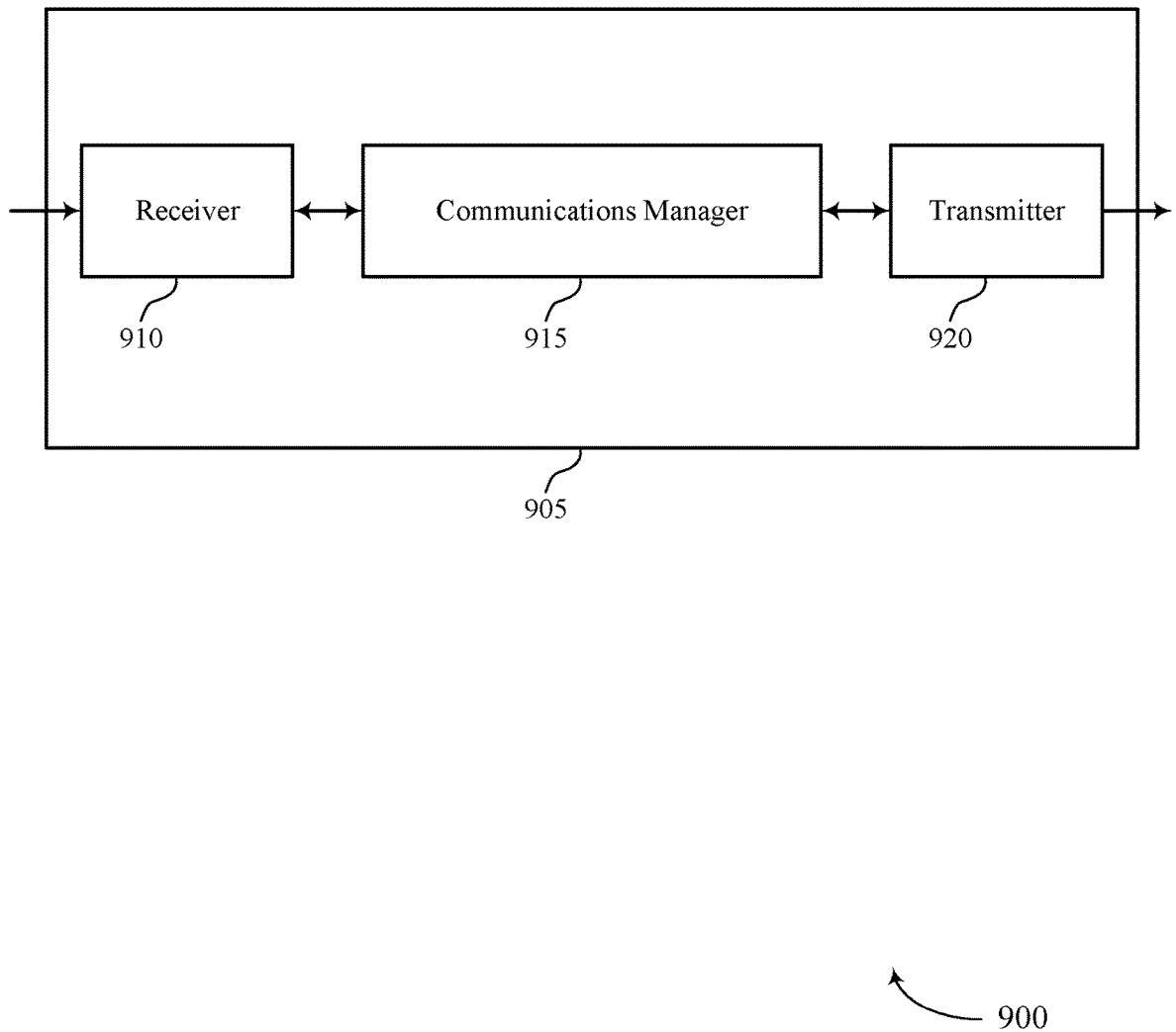
FIGS. 9 and 10 show block diagrams of devices that support multi-level configuration and reporting for positioning in NR systems in accordance with aspects of the present disclosure.

FIG. 9 shows a block diagram 900 of a device 905 that supports multi-level configuration and reporting for positioning in new radio in accordance with aspects of the present disclosure. The device 905 may be an example of aspects of a network entity or a base station 105 as described herein. The device 905 may include a receiver 910, a communications manager 915, and a transmitter 920. The device 905 may also include a processor. Each of these components may be in communication with one another (for example, via one or more buses).

The receiver 910 may receive information such as packets, user data, or control information associated with various information channels (for example, control channels, data channels, and information related to multi-level configuration and reporting for positioning in new radio, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive (e.g., obtain via the receiver 910 or a transceiver), from a UE, an indication of a capability for reporting measurements related to positioning of the UE. The communications manager 915 may determine, based on the indication, one or more configurations associated with one or more base stations, the one or more configurations including one or more positioning reference signal resources and one or more reporting levels for the UE including a first reporting level for the UE. The communications manager 915 may initiate or generate for transmission by the transmitter 920 or a transceiver, to the UE based on the determining, signaling including the one or more configurations. The communications manager 915 may receive (e.g., obtain via the receiver 510 or a transceiver), from the UE based on the one or more configurations, one or more report parameters associated with the positioning of the UE with the positioning of the UE with the first reporting level for the UE or a second reporting level for the UE that is different than the first reporting level. The communications manager 915 may be an example of aspects of the communications manager 1210 described herein.

The communications manager 915, or its sub-components, may be implemented in hardware, code (for example, software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at different locations, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
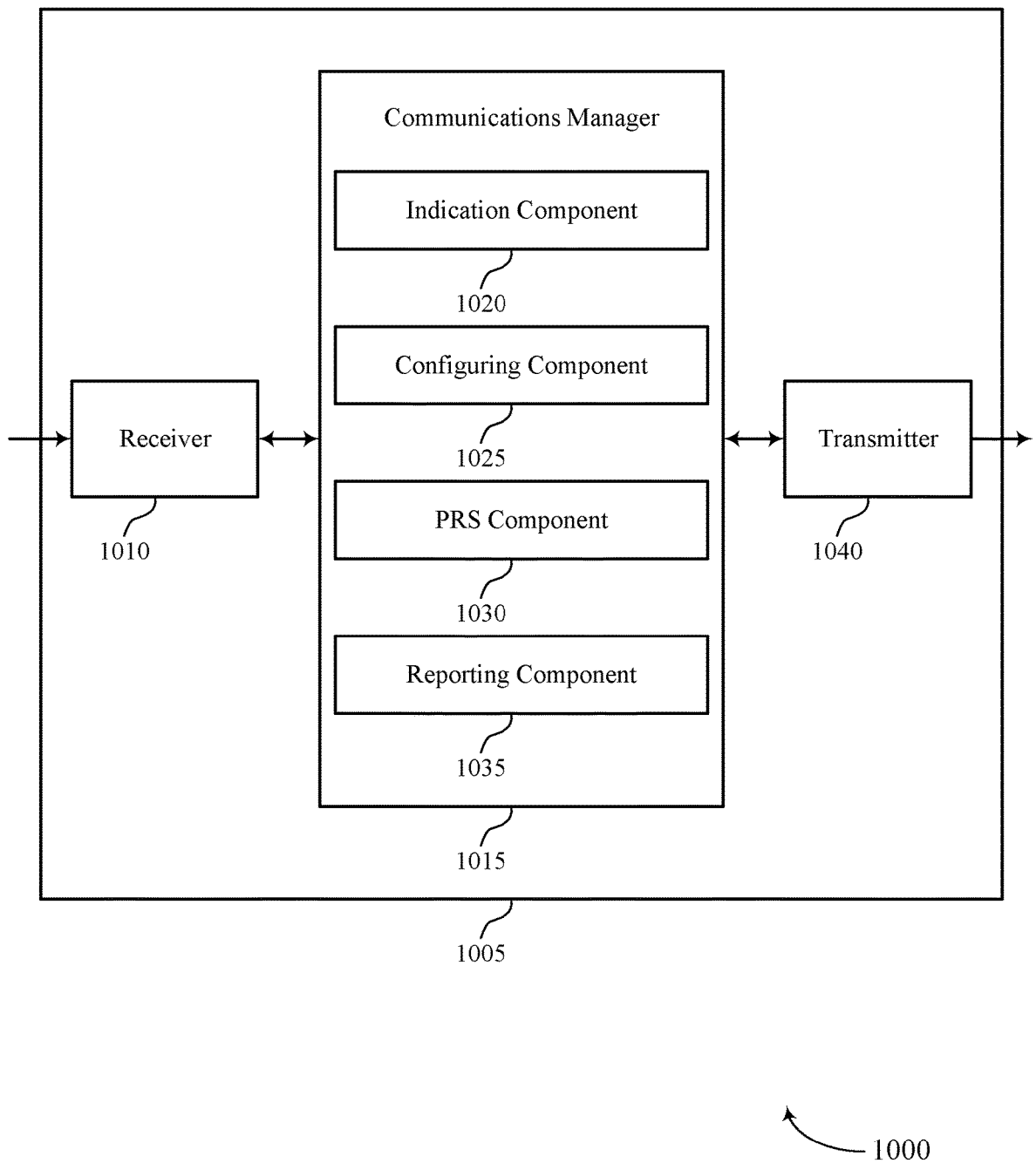

FIG. 10 shows a block diagram 1000 of a device 1005 that supports multi-level configuration and reporting for positioning in new radio in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (for example, via one or more buses).

The receiver 1010 may receive information such as packets, user data, or control information associated with various information channels (for example, control channels, data channels, and information related to multi-level configuration and reporting for positioning in new radio, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an indication component 1020, a configuring component 1025, a PRS component 1030, and a reporting component 1035. The communications manager 1015 may be an example of aspects of the communications manager 1210 described herein.

The indication component 1020 may receive, from a UE, an indication of a capability for reporting measurements related to positioning of the UE.

The configuring component 1025 may determine, based on the indication, one or more configurations associated with one or more base stations, the one or more configurations including one or more positioning reference signal resources and one or more reporting levels for the UE including a first reporting level for the UE.

The PRS component 1030 may transmit, to the UE based on the determining, signaling including the one or more configurations.

The reporting component 1035 may receive, from the UE based on the one or more configurations, one or more report parameters associated with the positioning of the UE with the positioning of the UE with the first reporting level for the UE or a second reporting level for the UE that is different than the first reporting level.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
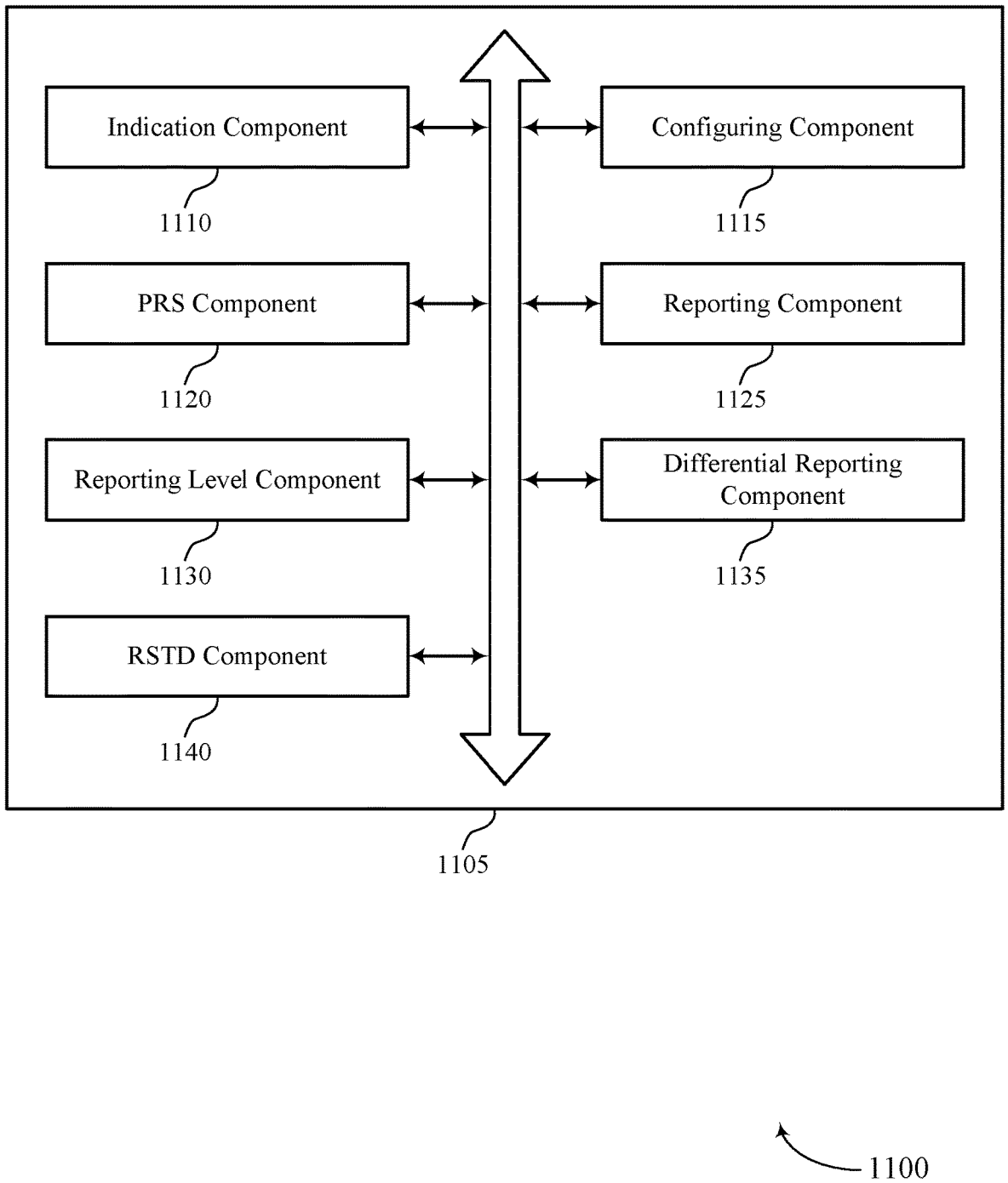
FIG. 11 shows a block diagram of a communications manager that supports multi-level configuration and reporting for positioning in NR systems in accordance with aspects of the present disclosure.

FIG. 11 shows a block diagram 1100 of a communications manager 1105 that supports multi-level configuration and reporting for positioning in new radio in accordance with aspects of the present disclosure. The communications manager 1105 may be an example of aspects of a communications manager 915, a communications manager 1015, or a communications manager 1210 described herein. The communications manager 1105 may include an indication component 1110, a configuring component 1115, a PRS component 1120, a reporting component 1125, a reporting level component 1130, a differential reporting component 1135, and a RSTD component 1140. Each of these modules may communicate, directly or indirectly, with one another (for example, via one or more buses).

The indication component 1110 may receive, from a UE, an indication of a capability for reporting measurements related to positioning of the UE.

The configuring component 1115 may determine, based on the indication, one or more configurations associated with one or more base stations, the one or more configurations including one or more positioning reference signal resources and one or more reporting levels for the UE.

The PRS component 1120 may transmit, to the UE based on the determining, signaling including the one or more configurations.

In some examples, the PRS component 1120 may receive signaling from one or more neighboring base stations, where determining the one or more configurations is based on the receiving. In some examples, the PRS component 1120 may configure each of one or more positioning reference signal resource sets according to a positioning reference signal resource setting of the one or more positioning reference signal resource settings, each of the one or more report parameters corresponding to a positioning reference signal resource of the one or more positioning reference signal resources that span the one or more positioning reference signal resource sets, where transmitting the signaling is based on the configuring. In some examples, the one or more base stations include the base station and one or more neighboring base stations.

The reporting component 1125 may receive, from the UE based on the one or more configurations, one or more report parameters associated with the positioning of the UE.

In some examples, the reporting component 1125 may receive the report parameter for each (or at least one) positioning reference signal resource included in the one or more positioning reference signal resource sets based on a first reporting level for the UE. In some examples, the first reporting level for the UE is the same as a reporting level of the one or more reporting levels for the UE.

In some examples, the reporting component 1125 may receive, based on a second reporting level for the UE, a selected report parameter for each (or at least one) positioning reference signal resource set of the one or more positioning reference signal resource sets that are each corresponding or configured according to a positioning reference signal resource setting of the one or more positioning reference signal settings. In some examples, the second reporting level for the UE is the same as a reporting level of the one or more reporting levels for the UE. In some examples, the reporting component 1125 may receive the selected report parameter for each positioning reference signal resource set is based on a combining of the report parameter for each positioning reference signal resource included in a positioning reference signal resource set corresponding or configured according to the positioning reference signal resource setting.

In some examples, the reporting component 1125 may receive, based on a third reporting level for the UE, a selected report parameter for each (or at least one) positioning reference signal resource setting of the one or more positioning reference signal resource settings that each configure subset of the one or more positioning reference signal resource sets. In some examples, the third reporting level for the UE is the same as a reporting level of the one or more reporting levels for the UE. In some examples, the reporting component 1125 may receive the selected report parameter for each positioning reference signal resource setting is based on a combining of the report parameter for each positioning reference signal resource included in the subset.

In some examples, the reporting component 1125 may receive, based on a fourth reporting level for the UE, a selected report parameter for one or more base stations including the base station. In some examples, the fourth reporting level for the UE is the same as a reporting level of the one or more reporting levels for the UE. In some examples, the reporting component 1125 may receive the selected report parameter for the base station is based on a combining of the report parameter for the one or more positioning reference signal resources.

In some examples, the reporting component 1125 may receive, from the UE based on the transmitting, one or more additional report parameters associated with the positioning of the UE and configured according to a third reporting level for the UE, where receiving the one or more report parameters includes receiving the one or more report parameters corresponding to a first subset of the one or more positioning reference signal resources and receiving the one or more additional report parameters corresponding to a second subset of the one or more positioning reference signal resources.

In some examples, the one or more report parameters may correspond to one or more report quantities, including one or more of a time of arrival, a reference signal time difference, a reference signal receive power, an angle, a PRS identification number, a reception to transmission difference, a reference signal-to-noise ratio, or a reference signal receive quality.

In some examples, the selected report parameter for each positioning reference signal resource set corresponds to a positioning reference signal resource that is included in a positioning reference signal resource set corresponding or configured according to the positioning reference signal resource setting and that is associated with a configured reference identification value. In some examples, the selected report parameter for each positioning reference signal resource setting corresponds to a positioning reference signal resource that is included in the subset of the one or more positioning reference signal resource sets and is associated with a configured reference identification value. In some examples, the selected report parameter for the base station corresponds to a positioning reference signal resource of the one or more positioning reference signal resources and is associated with a configured reference identification value.

The reporting level component 1130 may transmit the one or more configurations associated with the one or more base stations includes transmitting a first reporting level for the UE, and where receiving the one or more report parameters includes receiving, based on the one or more configurations, the one or more report parameters with the first reporting level for the UE or a second reporting level for the UE that is different than the first reporting level. In some examples, the one or more configurations associated with the one or more base stations are based on a periodicity of receiving the indication.

The differential reporting component 1135 may receive a reference report parameter associated with a positioning reference signal resource included in a positioning reference signal resource set of the one or more positioning reference signal resource sets.

In some examples, the differential reporting component 1135 may receive the report parameter for each additional reference signal resource included in the positioning reference signal resource set, the report parameter for each additional reference signal resource including a differential relative to the reference report parameter. In some examples, the differential reporting component 1135 may receive a reference report parameter associated with a positioning reference signal resource set corresponding or configured according to the positioning reference signal resource setting. In some examples, the differential reporting component 1135 may receive the report parameter for each additional reference signal resource set corresponding or configured according to the positioning reference signal resource setting, the report parameter for each additional reference signal resource set including a differential relative to the reference report parameter.

The RSTD component 1140 may receive a reference signal time difference between a first time of arrival associated with a first positioning reference signal resource setting of the one or more positioning reference signal resource settings and a second time of arrival associated with a second positioning reference signal resource setting of the one or more positioning reference signal resource settings. In some examples, the RSTD component 1140 may receive a reference signal time difference between a first time of arrival associated with the base station and a second time of arrival associated with an alternative base station.

Figure 12:
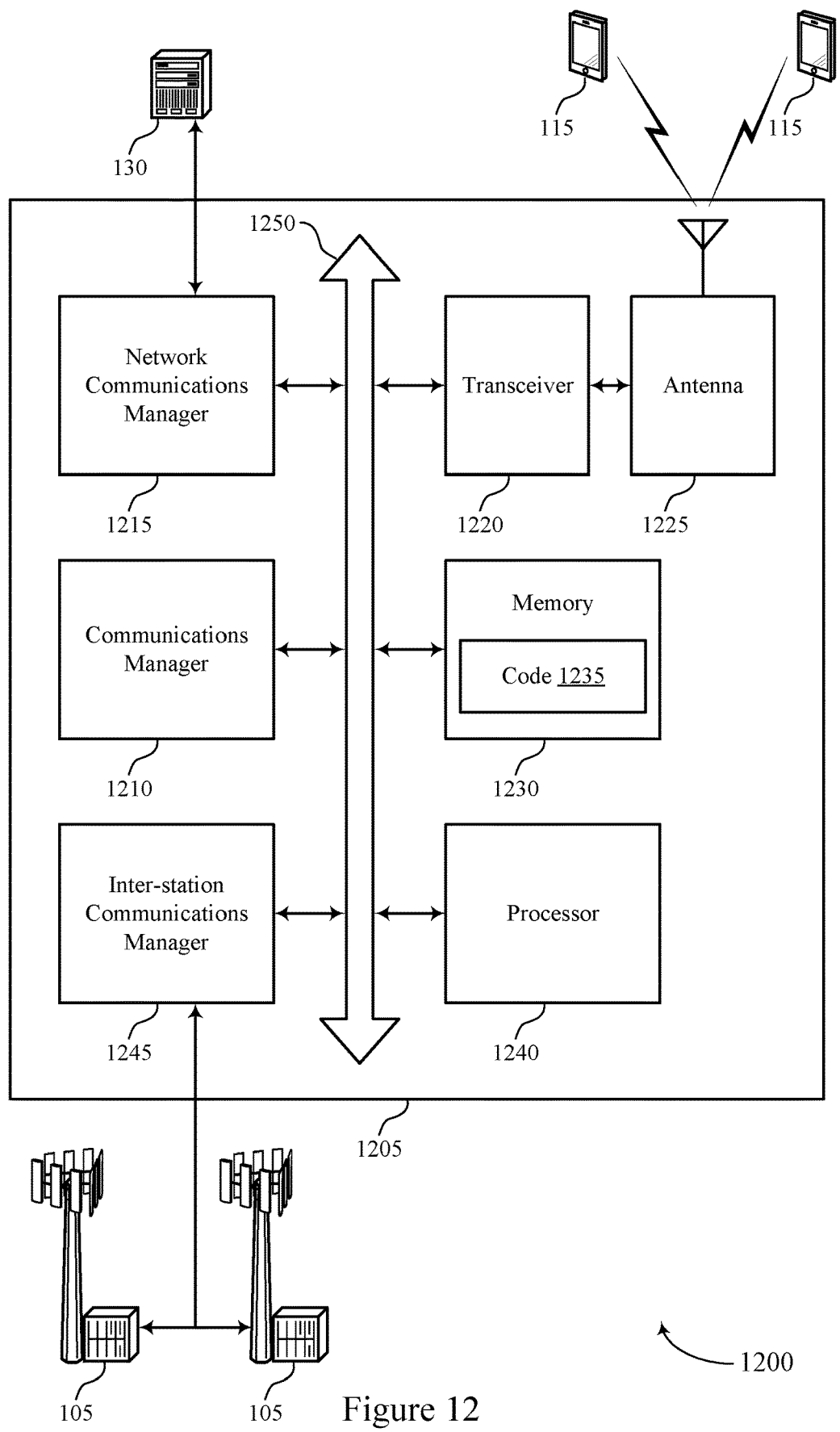
FIG. 12 shows a diagram of a system including a device that supports multi-level configuration and reporting for positioning in NR systems in accordance with aspects of the present disclosure.

FIG. 12 shows a diagram of a system 1200 including a device 1205 that supports multi-level configuration and reporting for positioning in new radio in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (for example, bus 1250).

The communications manager 1210 may receive (e.g., obtain via the transceiver 1220), from a UE, an indication of a capability for reporting measurements related to positioning of the UE, determine, based on the indication, one or more configurations associated with one or more TRPs, the one or more configurations including one or more positioning reference signal resources and one or more reporting levels for the UE, transmit, to the UE based on the determining, signaling including the one or more configurations, and receive, from the UE based on the one or more configurations, one or more report parameters associated with the positioning of the UE.

The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting multi-level configuration and reporting for positioning in new radio).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

In some examples, means for receiving, from a UE, an indication of a capability for reporting measurements related to positioning of the UE, may be performed by receiver 910, receiver 1010, or transceiver 1220, as described herein. In some examples, means for determining, based at least in part on the indication, one or more configurations associated with one or more TRPs, the one or more configurations comprising one or more positioning reference signal resources, may be performed by the communications manager 915, configuring component 1025 of communications manager 1005, configuring component 1115 of communications manager 1105, or communications manager 1210, as described herein. In some examples, means for transmitting, to the UE based at least in part on the determining, signaling comprising the one or more configurations, may be performed by transmitter 920, transmitter 1040, or transceiver 1220, as described herein. In some examples, means for receiving, from the UE based at least in part on the one or more configurations, one or more report parameters associated with the positioning of the UE with a first reporting level for the UE or a second reporting level for the UE that is different than the first reporting level, may be performed by receiver 910, receiver 1010, or transceiver 1220, as described herein.

Figure 13:
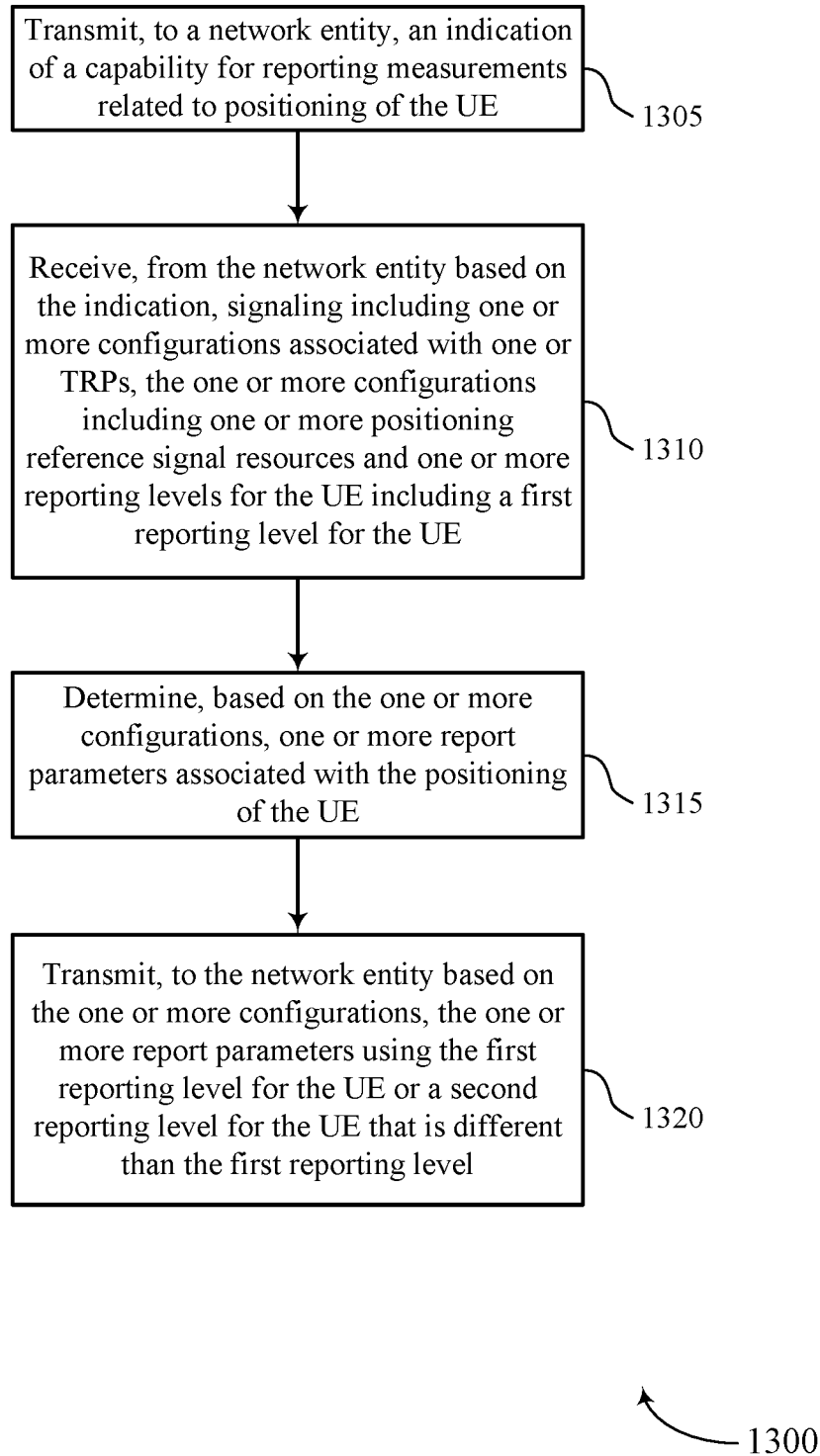
FIGS. 13 to 16 show flowcharts illustrating methods that support multi-level configuration and reporting for positioning in NR systems in accordance with aspects of the present disclosure.

FIG. 13 shows a flowchart illustrating a method 1300 that supports multi-level configuration and reporting for positioning in new radio in accordance with aspects of the present disclosure. The operations of method 1300 may be implemented by a UE 115 or its components as described herein. For example, the operations of method 1300 may be performed by a communications manager as described with reference to FIGS. 5-8. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to network entity (e.g., base station, access network entity, or other node), an indication of a capability for reporting measurements related to positioning of the UE. The operations of 1305 may be performed according to the methods described herein. In some examples, aspects of the operations of 1305 may be performed by an indication component as described with reference to FIGS. 5-8. Additionally or alternatively, means for performing 1305 may, but not necessarily, include, for example, antenna 825, transceiver 820, communications manager 810, memory 830 (including code 835), processor 840 and/or bus 845.

At 1310, the UE may receive, from the network entity (e.g., base station, access network entity, or other node) based on the indication, signaling including one or more configurations associated with one or more TRPs, the one or more configurations including one or more positioning reference signal resources and one or more reporting levels for the UE including a first reporting level for the UE. The operations of 1310 may be performed according to the methods described herein. In some examples, aspects of the operations of 1310 may be performed by a PRS component as described with reference to FIGS. 5-8. Additionally or alternatively, means for performing 1310 may, but not necessarily, include, for example, antenna 825, transceiver 820, communications manager 810, memory 830 (including code 835), processor 840 and/or bus 845.

At 1315, the UE may determine, based on the one or more configurations, one or more report parameters associated with the positioning of the UE. The operations of 1315 may be performed according to the methods described herein. In some examples, aspects of the operations of 1315 may be performed by a measuring component as described with reference to FIGS. 5-8. Additionally or alternatively, means for performing 1315 may, but not necessarily, include, for example, antenna 825, transceiver 820, communications manager 810, memory 830 (including code 835), processor 840 and/or bus 845.

At 1320, the UE may transmit, to the network entity (e.g., base station, access network entity, or other node) based on the one or more configurations, the one or more report parameters using the first reporting level for the UE or a second reporting level for the UE that is different than the first reporting level. The operations of 1320 may be performed according to the methods described herein. In some examples, aspects of the operations of 1320 may be performed by a reporting component as described with reference to FIGS. 5-8. Additionally or alternatively, means for performing 1320 may, but not necessarily, include, for example, antenna 825, transceiver 820, communications manager 810, memory 830 (including code 835), processor 840 and/or bus 845.

Figure 14:
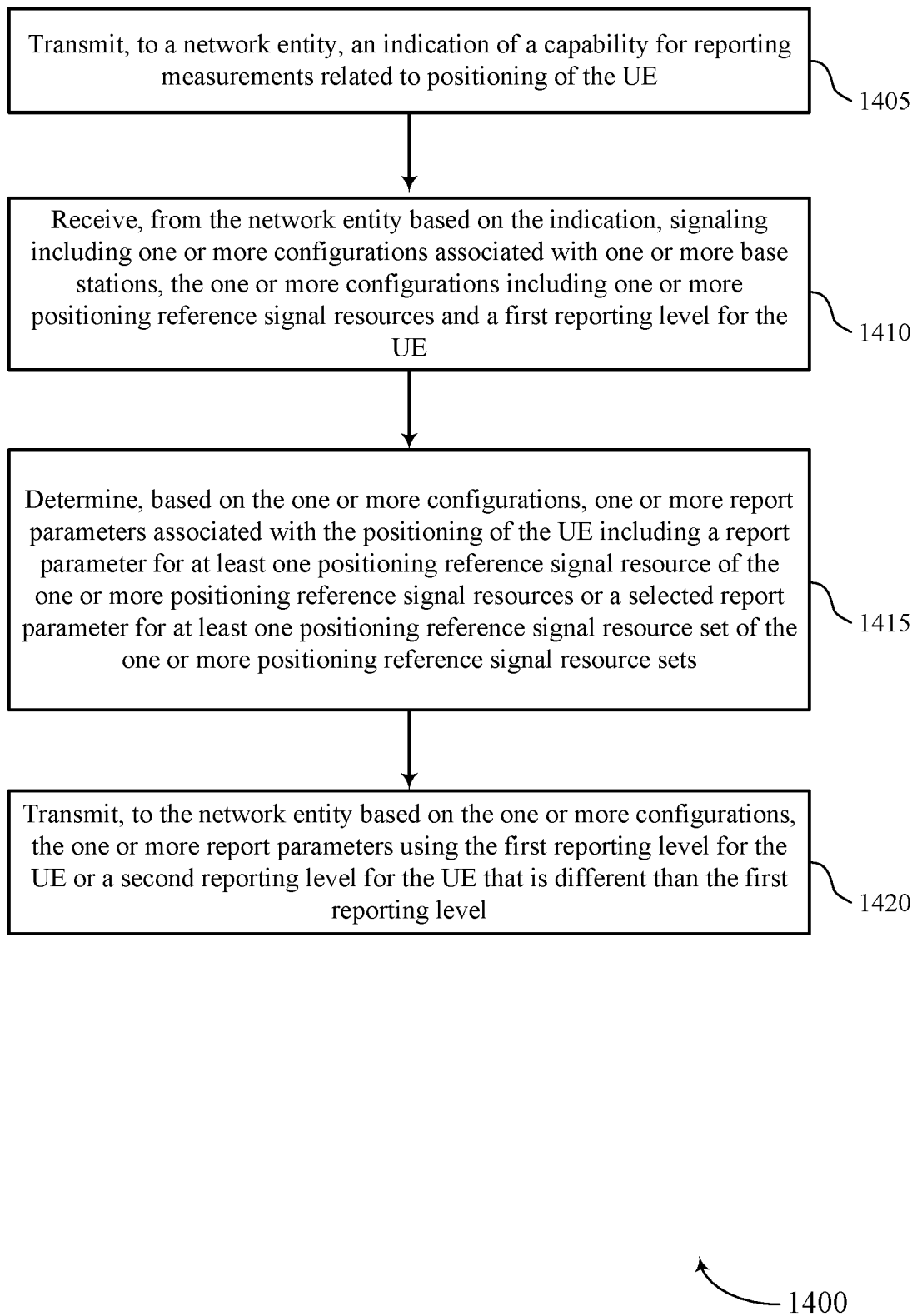

FIG. 14 shows a flowchart illustrating a method 1400 that supports multi-level configuration and reporting for positioning in new radio in accordance with aspects of the present disclosure. The operations of method 1400 may be implemented by a UE 115 or its components as described herein. For example, the operations of method 1400 may be performed by a communications manager as described with reference to FIGS. 5-8. In some examples, a UE may execute a set of instructions to control the functional elements of the UE to perform the functions described herein. Additionally or alternatively, a UE may perform aspects of the functions described herein using special-purpose hardware.

At 1405, the UE may transmit, to a network entity (e.g., base station, access network entity, or other node), an indication of a capability for reporting measurements related to positioning of the UE. The operations of 1405 may be performed according to the methods described herein. In some examples, aspects of the operations of 1405 may be performed by an indication component as described with reference to FIGS. 5-8. Additionally or alternatively, means for performing 1405 may, but not necessarily, include, for example, antenna 825, transceiver 820, communications manager 810, memory 830 (including code 835), processor 840 and/or bus 845.

At 1410, the UE may receive, from the network entity (e.g., base station, access network entity, or other node) based on the indication, signaling including one or more configurations associated with one or more TRPs, the one or more configurations including one or more positioning reference signal resources and a first reporting level for the UE. The operations of 1410 may be performed according to the methods described herein. In some examples, aspects of the operations of 1410 may be performed by a PRS component as described with reference to FIGS. 5-8. Additionally or alternatively, means for performing 1410 may, but not necessarily, include, for example, antenna 825, transceiver 820, communications manager 810, memory 830 (including code 835), processor 840 and/or bus 845.

At 1415, the UE may determine, based on the one or more configurations, one or more report parameters associated with the positioning of the UE including a report parameter for at least one positioning reference signal resource of the one or more positioning reference signal resources or a selected report parameter for at least one positioning reference signal resource set of the one or more positioning reference signal resource sets. The operations of 1415 may be performed according to the methods described herein. In some examples, aspects of the operations of 1415 may be performed by a measuring component as described with reference to FIGS. 5-8. Additionally or alternatively, means for performing 1415 may, but not necessarily, include, for example, antenna 825, transceiver 820, communications manager 810, memory 830 (including code 835), processor 840 and/or bus 845.

At 1420, the UE may transmit, to the network entity (e.g., base station, access network entity, or other node) based on the one or more configurations, the one or more report parameters using the first reporting level for the UE or a second reporting level for the UE that is different than the first reporting level. The operations of 1420 may be performed according to the methods described herein. In some examples, aspects of the operations of 1420 may be performed by a reporting component as described with reference to FIGS. 5-8. Additionally or alternatively, means for performing 1420 may, but not necessarily, include, for example, antenna 825, transceiver 820, communications manager 810, memory 830 (including code 835), processor 840 and/or bus 845.

Figure 15:
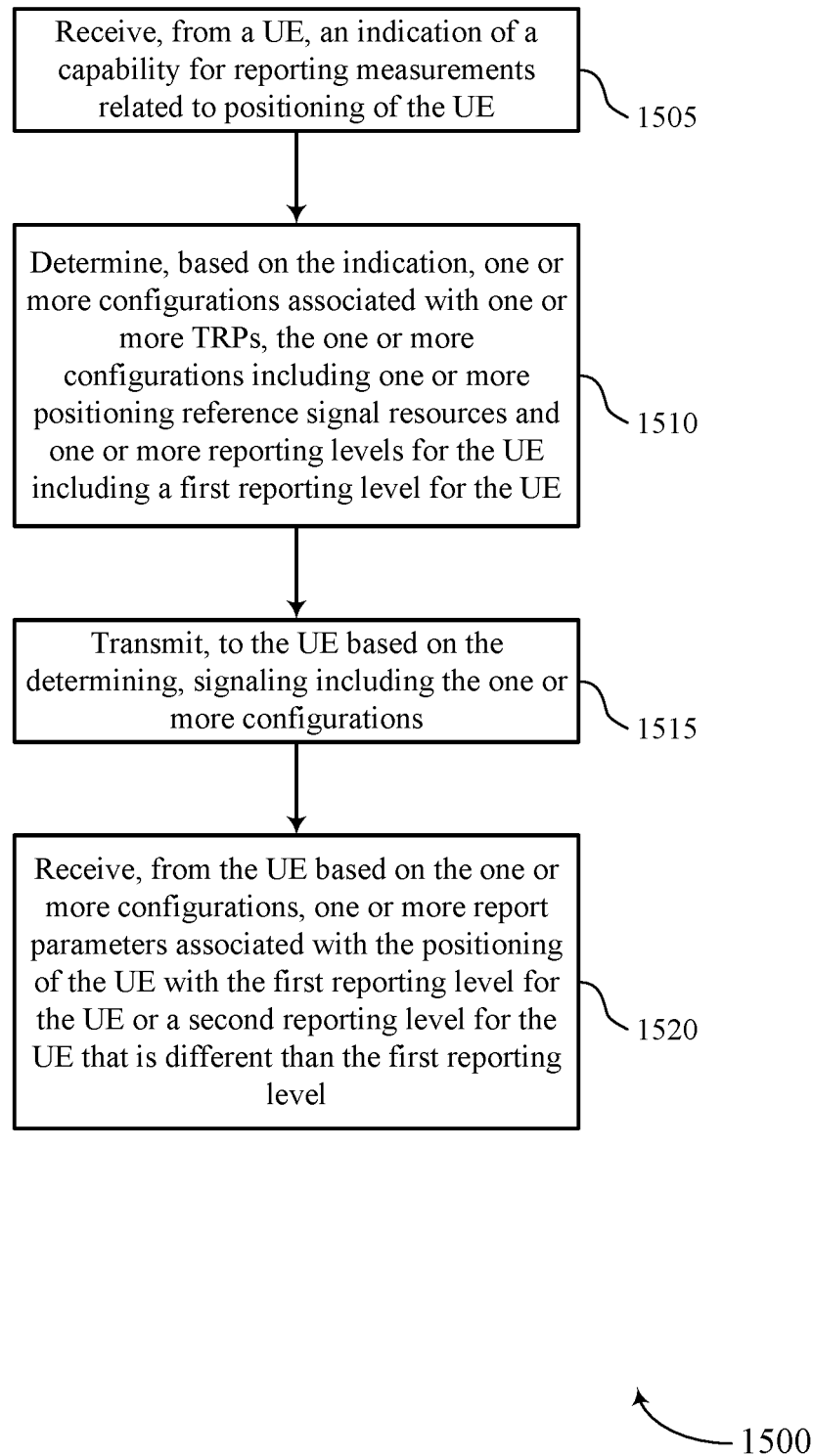

FIG. 15 shows a flowchart illustrating a method 1500 that supports multi-level configuration and reporting for positioning in new radio in accordance with aspects of the present disclosure. The operations of method 1500 may be implemented by a base station 105 or a network entity or its components as described herein. For example, the operations of method 1500 may be performed by a communications manager as described with reference to FIGS. 9-12. In some examples, a base station may execute a set of instructions to control the functional elements of the base station to perform the functions described herein. Additionally or alternatively, a base station may perform aspects of the functions described herein using special-purpose hardware.

At 1505, a network entity (e.g., base station, access network entity, or other node) may receive, from a UE, an indication of a capability for reporting measurements related to positioning of the UE. The operations of 1505 may be performed according to the methods described herein. In some examples, aspects of the operations of 1505 may be performed by an indication component as described with reference to FIGS. 9-12. Additionally or alternatively, means for performing 1505 may, but not necessarily, include, for example, antenna 1225, transceiver 1220, communications manager 1210, memory 1230 (including code 1235), processor 1240 and/or bus 1250.

At 1510, the network entity (e.g., base station, access network entity, or other node) may determine, based on the indication, one or more configurations associated with one or more TRPs, the one or more configurations including one or more positioning reference signal resources and one or more reporting levels for the UE including a first reporting level for the UE. The operations of 1510 may be performed according to the methods described herein. In some examples, aspects of the operations of 1510 may be performed by a configuring component as described with reference to FIGS. 9-12. Additionally or alternatively, means for performing 1510 may, but not necessarily, include, for example, antenna 1225, transceiver 1220, communications manager 1210, memory 1230 (including code 1235), processor 1240 and/or bus 1250.

At 1515, the network entity (e.g., base station, access network entity, or other node) may transmit, to the UE based on the determining, signaling including the one or more configurations. The operations of 1515 may be performed according to the methods described herein. In some examples, aspects of the operations of 1515 may be performed by a PRS component as described with reference to FIGS. 9-12. Additionally or alternatively, means for performing 1515 may, but not necessarily, include, for example, antenna 1225, transceiver 1220, communications manager 1210, memory 1230 (including code 1235), processor 1240 and/or bus 1250.

At 1520, the network entity (e.g., base station, access network entity, or other node) may receive, from the UE based on the one or more configurations, one or more report parameters associated with the positioning of the UE with the first reporting level for the UE or a second reporting level for the UE that is different than the first reporting level. The operations of 1520 may be performed according to the methods described herein. In some examples, aspects of the operations of 1520 may be performed by a reporting component as described with reference to FIGS. 9-12. Additionally or alternatively, means for performing 1520 may, but not necessarily, include, for example, antenna 1225, transceiver 1220, communications manager 1210, memory 1230 (including code 1235), processor 1240 and/or bus 1250.

Figure 16:
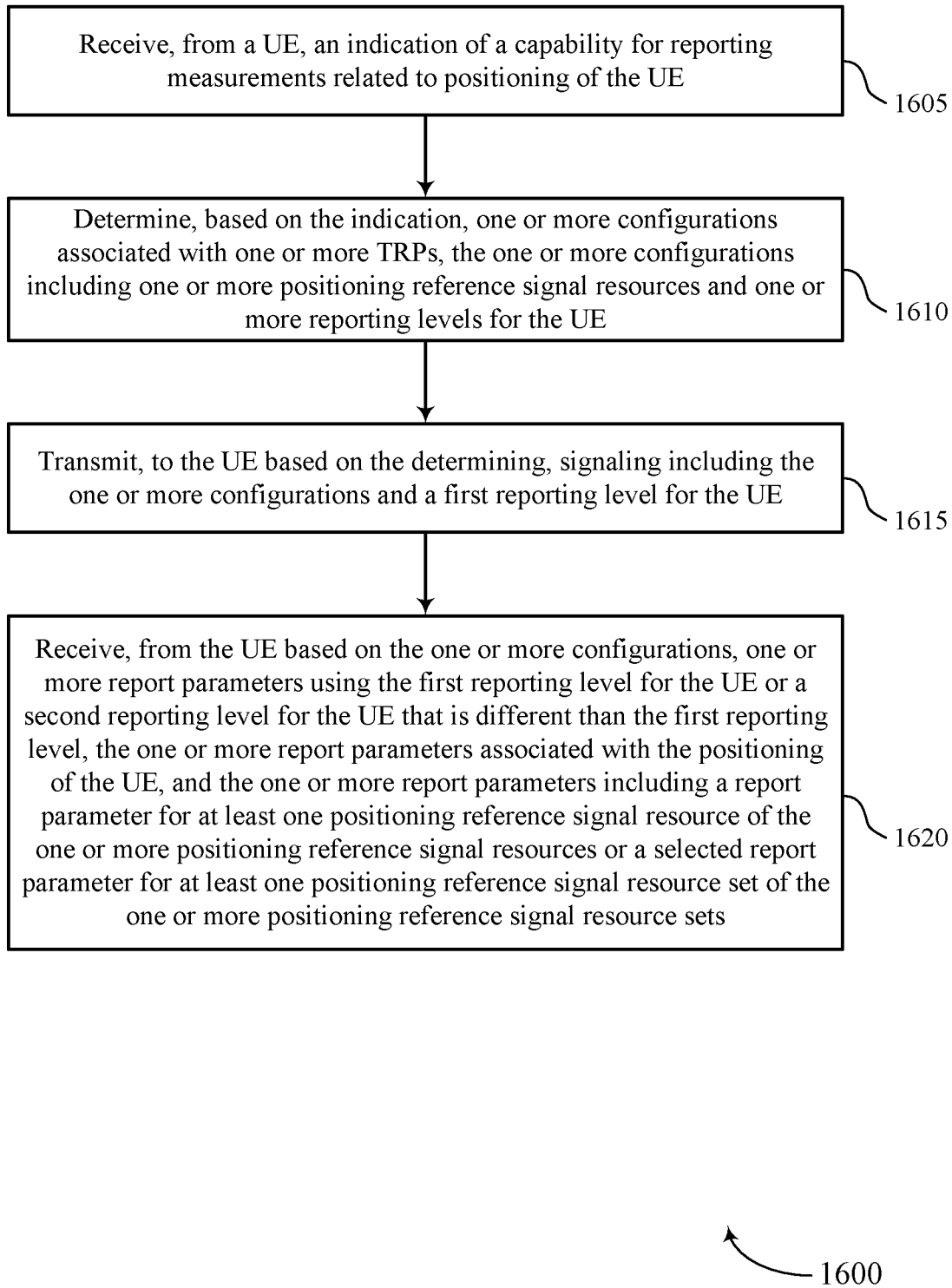

FIG. 16 shows a flowchart illustrating a method 1600 that supports multi-level configuration and reporting for positioning in new radio in accordance with aspects of the present disclosure. The operations of method 1600 may be implemented by a base station 105 or a network entity or its components as described herein. For example, the operations of method 1600 may be performed by a communications manager as described with reference to FIGS. 9-12. In some examples, a base station may execute a set of instructions to control the functional elements of the base station to perform the functions described herein. Additionally or alternatively, a base station may perform aspects of the functions described herein using special-purpose hardware.

At 1605, a network entity (e.g., base station, access network entity, or other node) may receive, from a UE, an indication of a capability for reporting measurements related to positioning of the UE. The operations of 1605 may be performed according to the methods described herein. In some examples, aspects of the operations of 1605 may be performed by an indication component as described with reference to FIGS. 9-12. Additionally or alternatively, means for performing 1605 may, but not necessarily, include, for example, antenna 1225, transceiver 1220, communications manager 1210, memory 1230 (including code 1235), processor 1240 and/or bus 1250.

At 1610, the network entity (e.g., base station, access network entity, or other node) may determine, based on the indication, one or more configurations associated with one or more TRPs, the one or more configurations including one or more positioning reference signal resources and one or more reporting levels for the UE. The operations of 1610 may be performed according to the methods described herein. In some examples, aspects of the operations of 1610 may be performed by a configuring component as described with reference to FIGS. 9-12. Additionally or alternatively, means for performing 1610 may, but not necessarily, include, for example, antenna 1225, transceiver 1220, communications manager 1210, memory 1230 (including code 1235), processor 1240 and/or bus 1250.

At 1615, the network entity (e.g., base station, access network entity, or other node) may transmit, to the UE based on the determining, signaling including the one or more configurations and a first reporting level for the UE. The operations of 1615 may be performed according to the methods described herein. In some examples, aspects of the operations of 1615 may be performed by a PRS component as described with reference to FIGS. 9-12. Additionally or alternatively, means for performing 1615 may, but not necessarily, include, for example, antenna 1225, transceiver 1220, communications manager 1210, memory 1230 (including code 1235), processor 1240 and/or bus 1250.

At 1620, the network entity (e.g., base station, access network entity, or other node) may receive, from the UE based on the one or more configurations, one or more report parameters using the first reporting level for the UE or a second reporting level that is different than the first reporting level, the one or more report parameters associated with the positioning of the UE, and the one or more report parameters including a report parameter for at least one positioning reference signal resource of the one or more positioning reference signal resources or a selected report parameter for at least one positioning reference signal resource set of the one or more positioning reference signal resource sets. The operations of 1620 may be performed according to the methods described herein. In some examples, aspects of the operations of 1620 may be performed by a reporting component as described with reference to FIGS. 9-12. Additionally or alternatively, means for performing 1620 may, but not necessarily, include, for example, antenna 1225, transceiver 1220, communications manager 1210, memory 1230 (including code 1235), processor 1240 and/or bus 1250.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person having ordinary skill in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more transceivers;
   one or more memory; and one or more processors electronically coupled to the one or more memory and the one or more transceivers, the one or more processors configured to cause the apparatus to:

receive, via the one or more transceivers from a network entity, signaling comprising one or more configurations associated with one or more transmission/reception points (TRPs), the one or more configurations comprising one or more positioning reference signal resources; and transmit, via the one or more transceivers to the network entity based at least in part on the one or more configurations, a reporting level and one or more report parameters associated with the one or more positioning reference signal resources, wherein the reporting level indicates a resource level, a resource set level or both, for one or more positioning reference signal measurements associated with the one or more positioning reference signal resources, wherein the UE is capable of using the reporting level at a first reporting level for the UE and the reporting level at a second reporting level for the UE and the first reporting level is a different reporting level than the second reporting level.

2. The apparatus of claim 1, wherein the one or more processors are configured to cause the apparatus to:
determine, based at least in part on the one or more configurations, the one or more report parameters associated with positioning of the UE.

3. The apparatus of claim 1, wherein the one or more processors are configured to cause the apparatus to:
determine a report parameter for at least one positioning reference signal resource of one or more positioning reference signal resources.

4. The apparatus of claim 3, wherein the one or more processors are configured to cause the apparatus to:
transmit, using the second reporting level for the UE, a selected report parameter for at least one positioning reference signal resource of the one or more positioning reference signal resources.

5. The apparatus of claim 1, wherein the one or more processors are configured to cause the apparatus to:
determine a report parameter for at least one positioning reference signal resource set of one or more positioning reference signal resource sets.

6. The apparatus of claim 5, wherein the one or more processors are configured to cause the apparatus to:
transmit, using the second reporting level for the UE, a selected report parameter for at least one positioning reference signal resource set of the one or more positioning reference signal resource sets.

7. The apparatus of claim 1, wherein each of the positioning reference signal resources of the one or more positioning reference signal resources correspond to a respective beam at the network entity.

8. The apparatus of claim 1, wherein the one or more processors are configured to cause the apparatus to:
transmit, using the second reporting level for the UE, a selected report parameter for at least one positioning reference signal resource set of one or more positioning reference signal resource sets, wherein each of the one or more positioning reference signal resource sets is associated with a corresponding positioning reference signal resource setting of one or more positioning reference signal resource settings.

9. The apparatus of claim 8, wherein the corresponding positioning reference signal resource setting comprises a plurality of positioning reference signal resources.

10. The apparatus of claim 8, wherein the corresponding positioning reference signal resource setting comprises a plurality of positioning reference signal resource sets.

11. The apparatus of claim 1, wherein the one or more processors are configured to cause the apparatus to:
identify one or more of a number of the one or more positioning reference signal resources included in a positioning reference resource set, a number of positioning reference resource sets, or a number of TRPs; and transmit, based at least in part on the identifying, the one or more report parameters, using the second reporting level for the UE that is different than the first reporting level.

12. An apparatus for wireless communication at a network entity, comprising:
one or more transceivers;
one or more memory; and
one or more processors electronically coupled to the one or more memory and the one or more transceivers, the one or more processors configured to cause the apparatus to:
receive, via the one or more transceivers from a user equipment (UE), an indication of a capability for reporting measurements related to positioning of the UE;

transmit, via the one or more transceivers to the UE, signaling comprising one or more configurations associated with one or more transmission/reception points (TRPs); and receive, via the one or more transceivers from the UE based at least in part on the one or more configurations, a reporting level and one or more report parameters associated with the positioning of the UE with a first reporting level for the UE, and a second reporting level for the UE that is a different reporting level than the first reporting level, wherein each reporting level indicates: a resource level, a resource set level or both, for one or more positioning reference signal measurements associated with one or more positioning reference signal resources.

13. The apparatus of claim 12, wherein the one or more processors are configured to cause the apparatus to:
determine, based at least in part on the indication, the one or more configurations, the one or more configurations comprising one or more positioning reference signal resources.

14. The apparatus of claim 13, wherein the one or more processors are configured to cause the apparatus to:
configure each of one or more positioning reference signal resource sets according to a positioning reference signal resource setting of one or more positioning reference signal resource settings, each of the one or more report parameters corresponding to a positioning reference signal resource of the one or more positioning reference signal resources that span the one or more positioning reference signal resource sets, wherein the signaling is based at least in part on the configuring.

15. The apparatus of claim 14, wherein the one or more processors are configured to cause the apparatus to:
receive a report parameter for at least one positioning reference signal resource included in the one or more positioning reference signal resource sets based at least in part on the first reporting level for the UE.

16. The apparatus of claim 14, wherein the one or more processors are configured to cause the apparatus to:

receive a selected report parameter for at least one positioning reference signal resource set of the one or more positioning reference signal resource sets, wherein each of the one or more positioning reference signal resource sets is associated with a corresponding positioning reference signal resource setting of the one or more positioning reference signal resource settings.

17. The apparatus of claim 16, wherein the positioning reference signal resource setting comprises a plurality of positioning reference signal resources.

18. The apparatus of claim 16, wherein the positioning reference signal resource setting comprises a plurality of positioning reference signal resource sets.

19. The apparatus of claim 16, wherein the second reporting level for the UE is a reporting level of one or more reporting levels for the UE indicated by the signaling comprising the one or more configurations.

20. The apparatus of claim 16, wherein the selected report parameter for the at least one positioning reference signal resource set corresponds to a positioning reference signal resource that is included in a positioning reference signal resource set associated with the corresponding positioning reference signal resource setting and a configured reference identification value.

21. The apparatus of claim 16, wherein receiving the selected report parameter for the at least one positioning reference signal resource set is based at least in part on a combining of a report parameter for each positioning reference signal resource included in a positioning reference signal resource set associated with the corresponding positioning reference signal resource setting.

22. The apparatus of claim 16, wherein the one or more processors are configured to cause the apparatus to:
receive a reference report parameter associated with a positioning reference signal resource set of the one or more positioning reference signal resource sets associated with the corresponding positioning reference signal resource setting; and
receive a report parameter for each additional reference signal resource set associated with the corresponding positioning reference signal resource setting, the report parameter for each additional reference signal resource set including a differential relative to the reference report parameter.

23. The apparatus of claim 13, wherein each positioning reference signal resource of the one or more positioning reference signal resources correspond to a respective beam at the network entity.

24. A method for wireless communications at a user equipment (UE), comprising:
receiving, from a network entity, signaling comprising one or more configurations associated with one or more transmission/reception points (TRPs), the one or more configurations comprising one or more positioning reference signal resources; and
transmitting, to the network entity based at least in part on the one or more configurations, a reporting level and one or more report parameters associated with the one or more positioning reference signal resources, wherein the reporting level indicates a resource level, a resource set level or both, for one or more positioning reference signal measurements associated with the one or more positioning reference signal resources, wherein the UE is capable of using the reporting level at a first reporting level for the UE and the reporting level at a second reporting level for the UE and the first reporting level is a different reporting level than the second reporting level.

25. A method for wireless communications at a network entity, comprising:
receiving, from a user equipment (UE), an indication of a capability for reporting measurements related to positioning of the UE;
transmitting, to the UE, signaling comprising one or more configurations associated with one or more transmission/reception points (TRPs); and
receiving, from the UE based at least in part on the one or more configurations, a reporting level and one or more report parameters associated with the positioning of the UE with a first reporting level for the UE, or a second reporting level for the UE that is a different reporting level than the first reporting level, wherein the one or more report parameters correspond to a reporting level of a plurality of reporting levels for the UE, the plurality of reporting levels comprising the first reporting level and the second reporting level, and the first reporting level and the second reporting level indicating: a resource level, a resource set level, or both, for one or more positioning reference signal measurements associated with one or more positioning reference signal resources.

\* \* \* \* \*